(12) United States Patent
Buckland

(10) Patent No.: US 11,210,422 B1
(45) Date of Patent: Dec. 28, 2021

(54) DATA CONTAINER INTERROGATION AND COMPLEX PERSONAL IDENTIFIABLE INFORMATION RULE MATCHING DATA ANALYSIS SYSTEM AND METHODS FOR THE IDENTIFICATION OF PERSONAL IDENTIFIABLE INFORMATION IN A DATA CONTAINER

(71) Applicant: Lee David Buckland, Round Rock, TX (US)

(72) Inventor: Lee David Buckland, Round Rock, TX (US)

(*) Notice: Subject to any disclaimer, the term of this patent is extended or adjusted under 35 U.S.C. 154(b) by 0 days.

(21) Appl. No.: 17/180,582

(22) Filed: Feb. 19, 2021

(51) Int. Cl.
| | |
|---|---|
| *H04L 29/06* | (2006.01) |
| *G06F 21/62* | (2013.01) |
| *G06F 21/71* | (2013.01) |
| *G06F 21/60* | (2013.01) |

(52) U.S. Cl.
CPC ........ *G06F 21/6245* (2013.01); *G06F 21/602* (2013.01); *G06F 21/71* (2013.01)

(58) Field of Classification Search
CPC ..... G06F 21/6245; G06F 21/602; G06F 21/62
See application file for complete search history.

(56) References Cited

U.S. PATENT DOCUMENTS

| | | | | |
|---|---|---|---|---|
| 9,246,887 | B1* | 1/2016 | Satish | G06F 21/6245 |
| 2007/0058815 | A1* | 3/2007 | Kwak | H04L 9/0841 |
| | | | | 380/286 |
| 2008/0008319 | A1* | 1/2008 | Poirier | H04N 21/2347 |
| | | | | 380/228 |
| 2008/0235521 | A1* | 9/2008 | Gosselin | G06F 21/6218 |
| | | | | 713/193 |
| 2014/0032259 | A1* | 1/2014 | LaFever | G06Q 30/0271 |
| | | | | 705/7.29 |
| 2017/0223022 | A1* | 8/2017 | Peterson | H04L 12/4625 |
| 2020/0302081 | A1* | 9/2020 | Faitelson | G06F 21/31 |

* cited by examiner

*Primary Examiner* — Jason K Gee
(74) *Attorney, Agent, or Firm* — Plager Schack LLP; Mark H. Plager; Stephen Hallberg

(57) ABSTRACT

A system and methods for identifying personal identifiable information in a data container are disclosed. The system and methods interrogate data at its most fundamental level, thereby allowing complex rule matching to occur. This can be coupled with a data in transit analysis mechanism, or be integrated into a data store search mechanism, to ensure maximum awareness of any potential issues with the security of the qualified data elements.

16 Claims, 12 Drawing Sheets

DATA CONTAINER INTERROGATION AND COMPLEX PERSONAL IDENTIFIABLE INFORMATION RULE MATCHING DATA ANALYSIS SYSTEM AND METHODS FOR THE IDENTIFICATION OF PERSONAL IDENTIFIABLE INFORMATION IN A DATA CONTAINER

BACKGROUND

Embodiments of the invention described in this specification relate generally to data security, and more particularly, to a data container interrogation and complex personal identifiable information rule matching data analysis system and associated methods for identifying personal identifiable information (PII) in a data container.

Increasing levels of privacy law around the world demand that data is stored securely. Traditional data leakage protection (DLP) rules examine data in-transit and for the most part focus on the text content that is easily accessible.

Traditional techniques identify patterns of data; however, many PII data elements do not always fit into a defined pattern, and could be overlooked.

Due to the sheer volume of data that exists, however, it is difficult to determine whether additional measures are required to keep data secure.

Therefore, what is needed is a way to analyze data elements, data structures, raw data, and other containers of data for the identification of personal identifiable information by interrogating data at its most fundamental level and using complex rule matching to ensure maximum awareness of any potential issues with the security of the qualified data elements.

BRIEF DESCRIPTION

A novel data container interrogation and complex personal identifiable information rule matching data analysis system and novel methods for identifying personal identifiable information (PIT) in a data container are disclosed. In some embodiments, the data container interrogation and complex personal identifiable information rule matching data analysis system and the methods for identifying PII in a data container interrogate data at its most fundamental level, thereby allowing complex rule matching to occur. In some embodiments, the interrogation of data and complex rule matching can be coupled with a data in-transit analysis mechanism, or integrated into a data store search mechanism, to ensure maximum awareness of any potential issues with the security of the qualified data elements.

In some embodiments, the methods for identifying personal identifiable information (PII) in a data container include (i) a method for determining whether to review a data container to identify PII in the data container, (ii) a method for reviewing required data elements of a data container being reviewed to identify PII in the data container, (iii) a method for securing a data container, (iv) a method for obtaining an encryption key for a data container to be secured, (v) a method for retrieving an encryption key, (vi) a method for storing an encryption key, (vii) a monitoring method for opening a data container, (viii) a method for entering an encryption key on behalf of a user, (ix) an application method for opening a data container, (x) a method for synchronizing encryption keys, and (xi) a detailed method for the identification of PII in a data container.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments include a novel data container interrogation and complex personal identifiable information rule matching data analysis system and associated methods for identifying personal identifiable information (PII) in a data container. In some embodiments, the data container interrogation and complex personal identifiable information rule matching data analysis system and the associated methods for identifying PII in a data container interrogate data at its most fundamental level, thereby allowing complex rule matching to occur. In some embodiments, the interrogation of data and complex rule matching can be coupled with a data in-transit analysis mechanism, or integrated into a data store search mechanism, to ensure maximum awareness of any potential issues with the security of the qualified data elements.

In some embodiments, the methods for identifying personal identifiable information (PII) in a data container include (i) a method for determining whether to review a data container to identify PII in the data container, (ii) a method for reviewing required data elements of a data container being reviewed to identify PII in the data container, (iii) a method for securing a data container, (iv) a method for obtaining an encryption key for a data container to be secured, (v) a method for retrieving an encryption key, (vi) a method for storing an encryption key, (vii) a monitoring method for opening a data container, (viii) a method for entering an encryption key on behalf of a user, (ix) an application method for opening a data container, (x) a method for synchronizing encryption keys, and (xi) a detailed method for the identification of PII in a data container.

Figure 1:
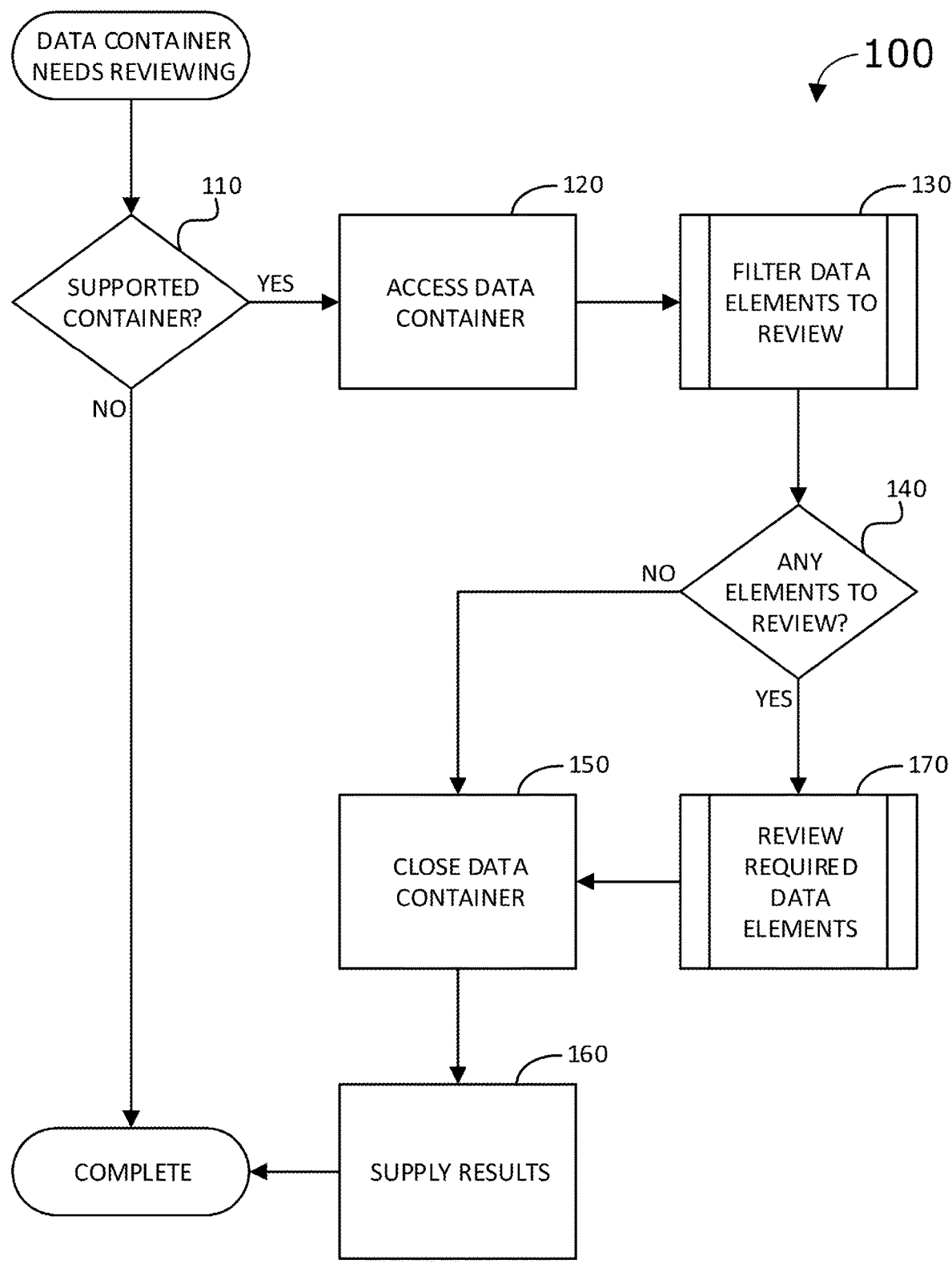
FIG. 1 conceptually illustrates a method for determining whether to review a data container to identify personal identifiable information (PII) in the data container in some embodiments.

As stated above, increasing levels of privacy law around the world demand that data is stored securely. Traditional DLP rules examine data in-transit and for the most part focus on the text content that is easily accessible. Due to the sheer volume of data that exists, however, it is difficult to determine whether additional measures are required to keep data secure. Embodiments of the data container interrogation and complex personal identifiable information rule matching data analysis system and the associated methods for identifying PII in a data container described in this specification solve such problems by establishing a connection to a storage medium, such as a file store or a database, to identify any data containers, such as files or database tables. In some embodiments, a threshold determination is made as to whether each identified data container should be reviewed in connection with identifying personal identifiable information. The threshold determination is demonstrated in connection with a method for determining whether to review a data container to identify PII in the data container, which is described below, by reference to FIG. 1. In some other embodiments, any and all identified data containers are reviewed, with no consideration of the threshold determination. Review of all identified data containers, without making the threshold determination, is demonstrated in connection with a detailed method for the identification of PII in a data container, which is described below, by reference to FIG. 11. Whether or not the threshold determination is considered, each identified data container (among those determined to be in need of review, or all such identified data containers, depending on the applicability of the threshold determination) is then interrogated against a number of defined complex matching rules to determine if a match is made, which can then be fed back for any follow-up action required to comply with legal, regulatory, and business needs.

Embodiments of the data container interrogation and complex personal identifiable information rule matching data analysis system and the associated methods for identifying PII in a data container described in this specification differ from and improve upon currently existing options. In particular, many organizations employ conventional, or traditional, data leakage protection (DLP) systems and methods to ensure that certain data—that is, data which meets certain criteria—is not exposed accidentally. The conventional practices of such traditional DLP systems are useful to prevent accidental exposure to qualified data in-transit, but fail to identify data points that need to be secured at rest. Since examination of data in-transit by existing traditional DLP systems fails to encompass data that is at rest, data at rest may be less secure than needed and, therefore, is vulnerable to data leakage. Superficial testing of data at rest may be performed by some of the existing traditional DLP systems. However, superficial testing may not reveal the extent of data that demands protection.

By contrast, the data container interrogation and complex personal identifiable information rule matching data analysis system and the associated methods for identifying PII in a data container of the present disclosure improve upon the conventional traditional DLP system methods by interrogating data at its most fundamental level and performing complex rule matching against the data to identifying matching data points. Furthermore, the data container interrogation and complex rule matching performed by the data container interrogation and complex personal identifiable information rule matching data analysis system and the associated methods for identifying PII in a data container of the present disclosure can be coupled with a data in-transit analysis mechanism or integrated into a data store search mechanism. In this way, the data container interrogation and complex personal identifiable information rule matching data analysis system and the associated methods for identifying PII in a data container ensure maximum awareness of any potential issues with the security of qualified data elements.

Specifically, the data container interrogation and complex personal identifiable information rule matching data analysis system performs several methods for identifying personal identifiable information (PII) in a data container including, in some embodiments, the method for determining whether to review a data container to identify PII in the data container. In some embodiments, the method for determining whether to review a data container to identify PII in the data container starts when a connection to a data container is established. In some embodiments, the method for determining whether to review a data container to identify PII in the data container first determines whether the data container is a supported data container. When the data container is not supported, the method for determining whether to review a data container to identify PII in the data container ends. On the other hand, when the data container is supported, the method for determining whether to review a data container to identify PII in the data container accesses the identified/supported data container, followed by filtering the data elements within the data container to those data elements that are intended for review. Based on the results of the filtering, the method for determining whether to review a data container to identify PII in the data container then determines whether there are any data elements to review. When there are no data elements to review, the method for determining whether to review a data container to identify PII in the data container simply closes the data container, supplies the results, and then ends. On the other hand, when there are one or more data elements to review after filtering is performed, then the method for determining whether to review a data container to identify PII in the data container reviews the data elements as required according to the filter results. In some embodiments, this is performed repeatedly as a process step to review all the data elements as required according to the filter results. In some embodiments, the process step to review all the data elements includes several other/additional steps and operations. An example of this is described below, by reference to FIG. 2. This is repeated until there is no more data elements from the set of filtered data elements to review. Accordingly, when there are no more data elements to review, the method for determining whether to review a data container to identify PII in the data container closes the data container, supplies the results, and then ends.

In some embodiments, the data container interrogation and complex personal identifiable information rule matching data analysis system performs the method for reviewing required data elements of a data container being reviewed when the process step is called in the method for determining whether to review a data container to identify PII in the data container. In some embodiments, the data container interrogation and complex personal identifiable information rule matching data analysis system performs the method for reviewing required data elements of a data container being reviewed independently of the method for determining whether to review a data container to identify PII in the data container. In some embodiments, the method for reviewing required data elements of a data container being reviewed starts by identifying a first required data element in a particular data container (already identified). This is followed by identifying a first active rule to use in connection with reviewing the identified data element. After both the data element and the active rule are identified, the method for reviewing required data elements of a data container being reviewed tests the identified data element against the identified active rule. Next, the method for reviewing required data elements of a data container being reviewed determines whether a match is found based on the results of the testing the identified data element against the identified active rule. When a match is found, the method for reviewing required data elements of a data container being reviewed stores the match result, and proceeds forward. On the other hand, when a match is not found, the method for reviewing required data elements of a data container being reviewed determines whether the identified active rule is the last active rule or not. When the identified active rule is determined to be the last active rule, then the method for reviewing required data elements of a data container being reviewed determines when the identified data element is the last required data element to review or not, and proceeds accordingly. However, when the identified active rule is not the last active rule, then the method for reviewing required data elements of a data container being reviewed proceeds to identify the next active rule, which is used to test the identified data element against this 'next' active rule, and moves forward as described above.

Referring back to the determination of whether a match is found when testing the identified data element against the active rule, after storing the match result, the method for reviewing required data elements of a data container being reviewed of some embodiments determines whether a match limit is reached. When the match limit is determined to be reached, the method for reviewing required data elements of a data container being reviewed of some embodiments supplies the results and then ends. On the other hand, when the match limit is not reached, the method for reviewing required data elements of a data container being reviewed proceeds to determine whether to keep the identified active rule as active or disabled. When the identified active rule is determined to remain active, the method for reviewing required data elements of a data container being reviewed returns to the determination of whether the identified active rule is the last active rule or not, and proceeds accordingly. On the other hand, when the identified active rule is determined not to remain active, the method for reviewing required data elements of a data container being reviewed of some embodiments disables or removes the rule, and then proceeds to the determination of whether the rule is the last active rule or not.

Also, whenever the method for reviewing required data elements of a data container being reviewed determines that a rule is the last active rule, the method for reviewing required data elements of a data container being reviewed moves forward to a step for determining whether the identified data element is the last required data element in the data container or not. When the identified data element is the last required data element, the method for reviewing required data elements of a data container being reviewed supplies the results and then ends. On the other hand, when the identified data element is not the last required data element, then the method for reviewing required data elements of a data container being reviewed moves forward to identify the next required data element in the data container, proceeding forward as noted above, until the method for reviewing required data elements of a data container being reviewed ends. The method for reviewing required data elements of a data container being reviewed is exemplified below, by reference to FIG. 2.

In some embodiments, the data container interrogation and complex personal identifiable information rule matching data analysis system performs the method for securing a data container when personal identifiable information (PII) is identified for one or more data elements in the data container. For example, if the results of the method for reviewing required data elements of a data container include at least one data element that has unsecured personal identifiable information (PII), then the data container interrogation and complex personal identifiable information rule matching data analysis system preferably secures the data container. In some embodiments, the method for securing a data container starts by determining whether the data container can be secured or not. When the data container cannot be secured, the method for securing a data container provides a notification that the data container cannot be secured, and then ends. On the other hand, when the data container can be secured, the method for securing a data container performs a process step to obtain an encryption key to use in securing the data container. In some embodiments, the process step to obtain an encryption key is carried out in several steps of a method for obtaining an encryption key for a data container to be secured. Details of the method for obtaining an encryption key for a data container to be secured are further described below, by reference to FIG. 4. After obtaining the encryption key, the method for securing a data container retrieves the data container, applies the encryption key obtained in the prior step, and then stores the secured data container. Then the method for securing a data container ends. The method for securing a data container is exemplified below, by reference to FIG. 3.

As described above, the process step to obtain an encryption key is carried out in several steps of the method for obtaining an encryption key for a data container to be secured. Details of the method for obtaining an encryption key for a data container to be secured are described here. In some embodiments, the method for obtaining an encryption key for a data container to be secured starts by performing a process step for retrieving an encryption key. In some embodiments, the process step for retrieving an encryption key is carried out in several steps of a method for retrieving an encryption key. Details of the method for retrieving the encryption key are further described below, by reference to FIG. 5. After performing the process step for retrieving the encryption key, the method for obtaining an encryption key for a data container to be secured determines whether the encryption key was found. When no encryption key was found, the method for obtaining an encryption key for a data container to be secured determines whether to add a new encryption key or not. When no encryption key is found and no new encryption key is determined to be added, the method for obtaining an encryption key for a data container to be secured provides a notification that no encryption key was found or added and then ends. However, when no encryption key is found but a new encryption key is determined to be added, the method for obtaining an encryption key for a data container to be secured then performs a process step to generate the new encryption key, followed by storing the newly generated encryption key.

Turning back to the determination of whether the encryption key is found during the process step for retrieving the encryption key, when the encryption key is found and retrieved, the method for obtaining an encryption key for a data container to be secured stores the retrieved encryption key. Next, the method for obtaining an encryption key for a data container to be secured supplies the encryption key as retrieved or generated. Then the method for obtaining an encryption key for a data container to be secured ends. The method for obtaining an encryption key for a data container to be secured is exemplified below, by reference to FIG. 4.

As described above, the process step for retrieving an encryption key is carried out in several steps of the method for retrieving an encryption key. Details of the method for retrieving an encryption key are described here. In some embodiments, the method for retrieving an encryption key starts by identifying a first encryption key repository, followed by searching for the encryption key in the identified repository. The method for retrieving an encryption key then determines whether an encryption key was found in the identified repository. When not found, the method for retrieving an encryption key determines whether the identified repository is the last repository in which to search for an encryption key. When the identified repository is the last repository, the method for retrieving an encryption key provides a notification that an encryption key was not found and, therefore, not retrieved. On the other hand, when the identified repository is not determined to be the last repository in which to search for an encryption key, the method for retrieving an encryption key then identifies the next encryption key repository, and follows the steps noted above after the identification of the first encryption key repository. Turning back to the determination of whether an encryption key is found in the identified repository, when an encryption key is affirmatively found in the identified repository, the method for retrieving an encryption key then determines whether the user is permitted to use the encryption key found in the identified repository or not. When the user is not permitted, the method for retrieving an encryption key returns to the step for determining whether the identified repository is the last repository, and continues through the steps noted above. However, when the user is affirmatively permitted, then the method for retrieving an encryption key supplies the encryption key found in the identified repository. Then the method for retrieving an encryption key ends. The method for retrieving an encryption key is exemplified below, by reference to FIG. 5.

As described above, the process step for storing the generated or retrieved encryption key is carried out in several steps of the method for storing the encryption key. Details of the method for storing the encryption key are described here. In some embodiments, for the purposes of resiliency and redundancy, the method for storing the encryption key starts by identifying a first encryption key repository, followed by searching for the encryption key in the identified encryption key repository. The method for storing the encryption key then determines whether the encryption key is found in the identified encryption key repository or not. When the encryption key is not found in the identified repository, the method for storing the encryption key creates the encryption key in the identified repository and continues forward to a step for determining whether the identified repository is the last repository. However, when the encryption key is affirmatively found in the identified encryption key repository, the method for storing the encryption key then determines whether to update the encryption key found in the identified repository or not. When no update is required for the encryption key found in the identified repository, the method for storing the encryption key transitions to the step for determining whether the identified encryption key repository is the last repository or not. On the other hand, when an update is required for the encryption key found in the identified repository, the method for storing the encryption key then updates the encryption key in the identified encryption key repository with the generated or retrieved encryption key that is intended to be stored. After updating the encryption key in the identified repository, the method for storing the encryption key moves on to the step for determining whether the identified encryption key repository is the last repository or not. When the identified repository is not the last repository, the method for storing the encryption key identifies the next encryption key repository, and continues through the steps of the method for storing the encryption key as noted above. On the other hand, when the identified encryption key repository is determined to be the last repository, then the method for storing the encryption key ends. The method for storing the encryption key is exemplified below, by reference to FIG. 6.

Figure 8:
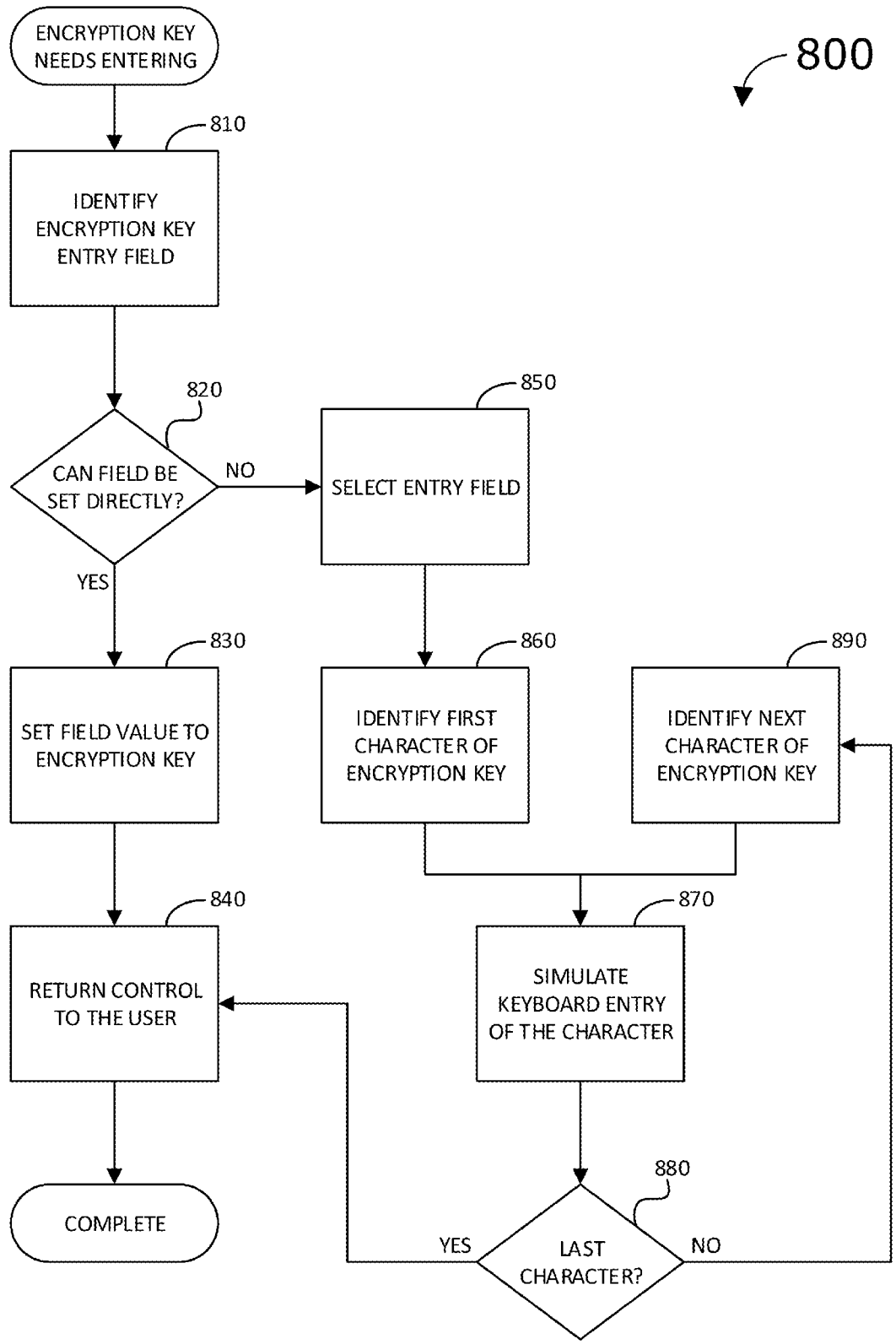
FIG. 8 conceptually illustrates a method for entering an encryption key on behalf of a user in some embodiments.

In some embodiments, the data container interrogation and complex personal identifiable information rule matching data analysis system performs a monitoring method for opening a data container. In some embodiments, the monitoring method for opening a data container is performed in a listener mode by the data container interrogation and complex personal identifiable information rule matching data analysis system, the monitoring method waiting until an operation is detected for a new window to open. Any opening of a new window may be related to a data container to open. Therefore, upon detection of a new window to open, the monitoring method for opening a data container determines whether the new window includes an encryption key prompt or not. When the new window being opened does not have an encryption key prompt, the monitoring method returns to the listener mode, waiting for another new window to be opened. However, when the encryption key prompt is detected in the new window, the monitoring method for opening a data container proceeds to a process step for identifying an applicable storage container. When an applicable storage container is affirmatively identified, the monitoring method for opening a data container performs a process step for obtaining the encryption key from the identified storage container. An example of a process step for obtaining the encryption key is described briefly above, and in detail below, by reference to FIG. 4. After performing the process step for obtaining the encryption key, the monitoring method for opening a data container determines whether the encryption key was obtained from the identified applicable storage container or not. When not obtained from the identified applicable storage container, the monitoring method returns to the listener mode to wait for an operation of opening a new window. In some embodiments, the monitoring method for opening a data container allows an encryption key to be entered when no encryption key is obtained from the identified applicable storage container. In that case, the data container may be opened upon entry of an encryption key. This is further described below, by reference to FIG. 9. On the other hand, when the encryption key is obtained from the identified applicable storage container, the monitoring method for opening a data container then proceeds to a process step for entering the encryption key on behalf of the user. The process step for entering the encryption key on behalf of the user is described further below, by reference to FIG. 8. After entering the encryption key on behalf of the user, the monitoring method for opening a data container returns to the listener mode to wait for a new window to open and proceeds accordingly.

In some embodiments, the process step for entering the encryption key on behalf of the user is carried out in several steps of a method for entering the encryption key on behalf of the user. Details of the method for entering the encryption key on behalf of the user are described here. In some embodiments, the method for entering the encryption key on behalf of the user starts by identifying an encryption key entry field and then determining when the field can be set directly or not. When the field can be set directly, the method for entering the encryption key on behalf of the user sets the field value to the encryption key and then returns control to the user. On the other hand, when the field cannot be set directly, the method for entering the encryption key on behalf of the user selects the entry field, identifies the first character of the encryption key, and simulates key entry of the character. Then the method for entering the encryption key on behalf of the user determines whether the identified character is the last character or not. When the identified character is the last character, the method for entering the encryption key on behalf of the user returns control to the user and then ends. On the other hand, when the identified character is not the last character, the method for entering the encryption key on behalf of the user identifies the next character of the encryption key and proceeds through the steps noted above until the last character is simulated as keyboard entry and control is returned to the user.

In some embodiments, the data container interrogation and complex personal identifiable information rule matching data analysis system performs an application method for opening a data container. In some embodiments, the application method for opening a data container is performed in relation to the monitoring method for opening a data container. In some embodiments, the application method for opening a data container starts by determining whether the data container is secured or not. When the data container is not secured, the data container is opened and the application method for opening a data container ends. On the other hand, when the data container is secured, the application method for opening a data container opens a window to enter the encryption key. The application method for opening a data container then determines whether the encryption key was entered or not. When the encryption key is entered, the data container is opened and the application method for opening a data container ends. However, when the encryption key is not entered, the user enters the encryption key to open the data container. Then the application method for opening a data container ends.

In some embodiments, the data container interrogation and complex personal identifiable information rule matching data analysis system performs a method for synchronizing encryption keys. In some embodiments, the method for synchronizing encryption keys starts by identifying a first encryption key repository, followed by determining whether the identified repository is the initiating repository or not. When the identified repository is the initiating repository, the method for synchronizing encryption keys determines whether the identified repository is the last repository or not. When the identified repository is not the last repository, the method for synchronizing encryption keys identifies the next encryption key repository and continues forward, as noted above. However, when the identified repository is the last repository, the method for synchronizing encryption keys ends.

Turning back to the determination of whether the identified repository is the initiating repository, the method for synchronizing encryption keys identifies the first encryption key to send or receive when the identified repository is not the initiating repository. Next, the method for synchronizing encryption keys synchronizes the encryption key, which is followed by a step for determining whether the identified encryption key is the last encryption key or not. When the identified encryption key is the last encryption key, the method for synchronizing encryption keys transitions to the determination of whether the identified repository is the last repository, as described above. On the other hand, when the identified encryption key is not the last encryption key, the method for synchronizing encryption keys identifies the next encryption key to send or receive, followed by synchronizing the encryption key, and subsequent steps as outlined above. In some embodiments, the method for synchronizing encryption keys ends after the identified repository is determined to be the last repository.

In some embodiments, the data container interrogation and complex personal identifiable information rule matching data analysis system performs a detailed method for the identification of personal identifiable information (PII) in a data container. In some embodiments, the detailed method for the identification of PII in a data container starts out with a data container that needs reviewing. When the data container needs reviewing, the detailed method for the identification of PII in a data container first determines when the data container is supported or not. When not supported, the detailed method for the identification of PII in a data container ends. However, when the data container is supported, the detailed method for the identification of PII in a data container accesses the data container and identifies the first data elements in the data container. After identifying the first data element, the detailed method for the identification of PII in a data container identifies the first active rule to process in connection with the identified data element, and then tests the identified data element against the identified active rule. The detailed method for the identification of PII in a data container then determines whether a match is made or not. When no match is made, the detailed method for the identification of PII in a data container determines whether the identified active rule is the last active rule or not. When the identified rule is not the last active rule, the detailed method for the identification of PII in a data container proceeds to identify the next active rule, and continues forward through the steps as noted above. However, when the identified active rule is affirmatively determined to be the last active rule, the detailed method for the identification of PII in a data container then determines whether a data element limit is reached or not. When the data element limit is not reached, the detailed method for the identification of PII in a data container identifies the next data element and proceeds through the rule processing steps as noted above. However, when the data element limit is reached, the detailed method for the identification of PII in a data container terminates access to the data container and provides feedback results. Then the detailed method for the identification of PII in a data container ends.

Turning back to the determination of whether a match was made when the identified data element is tested against the identified active rule, when a match is affirmatively made, the detailed method for the identification of PII in a data container of some embodiments stores the match results. After storing the match results, the detailed method for the identification of PII in a data container determines whether a match limit is reached or not. When the match limit is reached, the detailed method for the identification of PII in a data container proceeds to the determination of whether the data element limit is reached or not, and proceeds similarly as noted above. On the other hand, when the match limit is not reached, the detailed method for the identification of PII in a data container then determines whether to keep the identified active rule or not. When the identified active rule is kept, the detailed method for the identification of PII in a data container proceeds to the determination of whether the identified active rule is the last active rule, as described above. However, when the identified active rule is determined not to be kept, then the detailed method for the identification of PII in a data container disables or removes the identified active rule, followed by making a determination as to whether the identified disabled/removed rule is the last active rule or not, as described above. The detailed method for the identification of PII in a data container continues through these steps until the final data element limitation is reached, which triggers the detailed method for the identification of PII in a data container to terminate access to the data container and provide the feedback results, as noted above.

While the descriptions above provide a summary of the steps that are processed by the data container interrogation and complex personal identifiable information rule matching data analysis system, further examples of the methods for identifying personal identifiable information (PII) in a data container are detailed below, by reference to FIGS. 1-11.

The data container interrogation and complex personal identifiable information rule matching data analysis system and the associated methods for identifying PII in a data container of the present disclosure generally works by interrogation of data at a fundamental level along with complex rule matching being performed on the data. Specifically, within any given data container, individual data elements are stored. For example, these data elements may be contained within a cell within an electronic spreadsheet or a field within a data base table. In this way, a spreadsheet could be revealed to have many data elements for the many cells with data stored in a spreadsheet, for example. The system will iterate through these data elements, comparing each data element with one or more defined rules (the complex rule matching analysis). The defined rules are designed to identify whether the data element may be of a type that matches some legal, regulatory, or business classification for protected information. When a match is made, this information is fed back to the user so that further action can be taken to review and secure the information, if required. Fundamentally, the data container interrogation and complex personal identifiable information rule matching data analysis system and the associated methods for identifying PII in a data container has the ability to determine if a data element matches a given rule. This helps provide feedback so that additional action can be taken if required. While these important steps are outlined in a broad way here, a fully implemented solution would typically incorporate analysis and logic gates to perform iterative loops as needed and whether or when to optimize the rule matching for subsequent (iterative) analysis of other data elements within the same data container.

To make the data container interrogation and complex personal identifiable information rule matching data analysis system and the associated methods for identifying PII in a data container of the present disclosure, a software application is designed and coded to carry out the operations for the data container interrogation and complex personal identifiable information rule matching data analysis system as provided for in each and all of the associated methods for identifying PII in a data container. Furthermore, such software application may be implemented in a way to be fully supported to run within an operating system environment. When software application is executed, the software would take a number of parameters detailing the data store to interrogate, the criteria for determining which data containers to investigate, and how the results are to be processed. In a preferred embodiment, the software application searches for any and all file(s) of a particular file type. For example, the software application may search for a Microsoft Excel spreadsheet file. After finding a file that matches the search, the software application would then interrogate each data element within the data container. Each rule against which a data element will be compared can be based on a simplistic match (e.g., "begins with," "equals," "contains," or "ends with"), a generic match (e.g., compare against a regular expression), or custom logic that can be added into the application. In some embodiments, matching with regular expressions is supported. In some embodiments, other types of matching logic can be applied, including user-defined code that would operate as an add-in to the software application.

Organizations that need to ensure that data meeting legal, regulatory, and business requirements is appropriately secured may use the data container interrogation and complex personal identifiable information rule matching data analysis system and the associated methods for identifying PII in a data container of the present disclosure to tighten up their data security. For example many organizations have a number of legacy data containers (e.g., Microsoft Excel files) and, therefore, may need to ensure that any data within the legacy data containers which meets legal, regulatory, and business requirements is appropriately secured. Since the data container interrogation and complex personal identifiable information rule matching data analysis system and the associated methods for identifying PII in a data container can be used to identify gaps in compliance, organizations are able to secure their assets and reduce financial, reputational, strategic, and litigation risk.

Several more detailed embodiments of the data container interrogation and complex personal identifiable information rule matching data analysis system and the associated methods for identifying PII in a data container are described in the sections below. In Section I, several of the methods for identifying PII in a data container are described by reference to FIGS. 1-10, which are performed by the data container interrogation and complex personal identifiable information rule matching data analysis system. In Section II, a detailed method for identifying PII in a data container, as performed by a data container interrogation and complex personal identifiable information rule matching data analysis system, is described by reference to FIG. 11. Section III describes an electronic system with which some embodiments of the invention are implemented.

I. Methods for Identifying Personal Identifiable Information (PII) in a Data Container By way of example, FIG. 1 conceptually illustrates a method for determining whether to review a data container to identify personal identifiable information (PII) in the data container 100. As shown in this figure, the method for determining whether to review a data container to identify PII in the data container 100 starts when a connection to a data container is established. In some embodiments, the method for determining whether to review a data container to identify PII in the data container 100 first determines (at 110) whether the data container is a supported data container. In some embodiments, particular types of data containers are supported. For example, a data container that is a file, a spreadsheet with data, a database table, or another database structure that stores data in an organized manner may all be supported. In some embodiments, the types of supported data containers is configured in and evaluated by an analysis engine of the data container interrogation and complex personal identifiable information rule matching data analysis system. In addition to types of files and database structures, supported data containers may be configured to have qualifications that either allow or deny support of the data container (e.g., certain permissions that allow or deny access to the data container may be present).

Unsupported data containers result in the method for determining whether to review a data container to identify PII in the data container 100 completing/ending with no further actions. Thus, when the determination (at 110) is made that the data container is not supported, the method for determining whether to review a data container to identify PII in the data container 100 ends.

On the other hand, when the data container is determined (at 110) to be supported, the method for determining whether to review a data container to identify PII in the data container 100 accesses (at 120) the identified/supported data container, followed by filtering (at 130) the data elements within the data container to those data elements (in the data container) that are intended for review. In some embodiments, the filtering (at 130) operation outputs a set of results. Based on the results of the filtering (at 130), the method for determining whether to review a data container to identify PII in the data container 100 then determines (at 140) whether there are any data elements to review. For example, if at least one data element is shown in the filter results, then the determination (at 140) is made to review the data element(s).

Accordingly, when the filter results are determined (at 140) not to have any data elements to review, the method for determining whether to review a data container to identify PII in the data container 100 closes the data container (at 150) by terminating access to the data container. Then the method for determining whether to review a data container to identify PII in the data container 100 supplies results (at 160) of the filter results and subsequent determination of elements to review, if any, or none, as in this case, and then ends.

On the other hand, when there are one or more data elements determined (at 140) to be in the filtered results, then the method for determining whether to review a data container to identify PII in the data container 100 proceeds to review the required data elements (at 170) based on the filter results of data elements to review.

In some embodiments, the method for determining whether to review a data container to identify PII in the data container 100 repeatedly reviews each of the data elements successively, as required according to the filter results. In some embodiments, the method for determining whether to review a data container to identify PII in the data container 100 reviews all of the data elements in parallel, so that multiple threads of execution minimize processing time for reviewing the data elements identified in the filter results.

In some embodiments, the operation for reviewing the data results (at 170) is performed by a process step to review all the data elements. In some embodiments, the process step to review the data elements is performed successively (in serial, data element-by-data element fashion) or is performed in parallel, as configured in and evaluated by the analysis engine of the data container interrogation and complex personal identifiable information rule matching data analysis system. Whether the review of data elements is performed in parallel or sequentially, one after another, the process step to review all the data elements (at 170) includes several other/additional steps and operations that are not shown in this figure. An example of several steps related to review of required data elements, such as would be triggered by the process step to review all the data elements required by the filter results (at 170), are described below, by reference to FIG. 2.

In some embodiments, the review, processing, and related analysis steps are repeated until there is no more data elements from the set of filtered data elements to review. Accordingly, when there are no more data elements to review, the method for determining whether to review a data container to identify PII in the data container 100 closes the data container (at 150), for example, by terminating access to the data container. Then the method for determining whether to review a data container to identify PII in the data container 100 supplies the results (at 160). After supplying the results of the analysis of data elements in the data container, the method for determining whether to review a data container to identify PII in the data container 100 ends.

Figure 2:
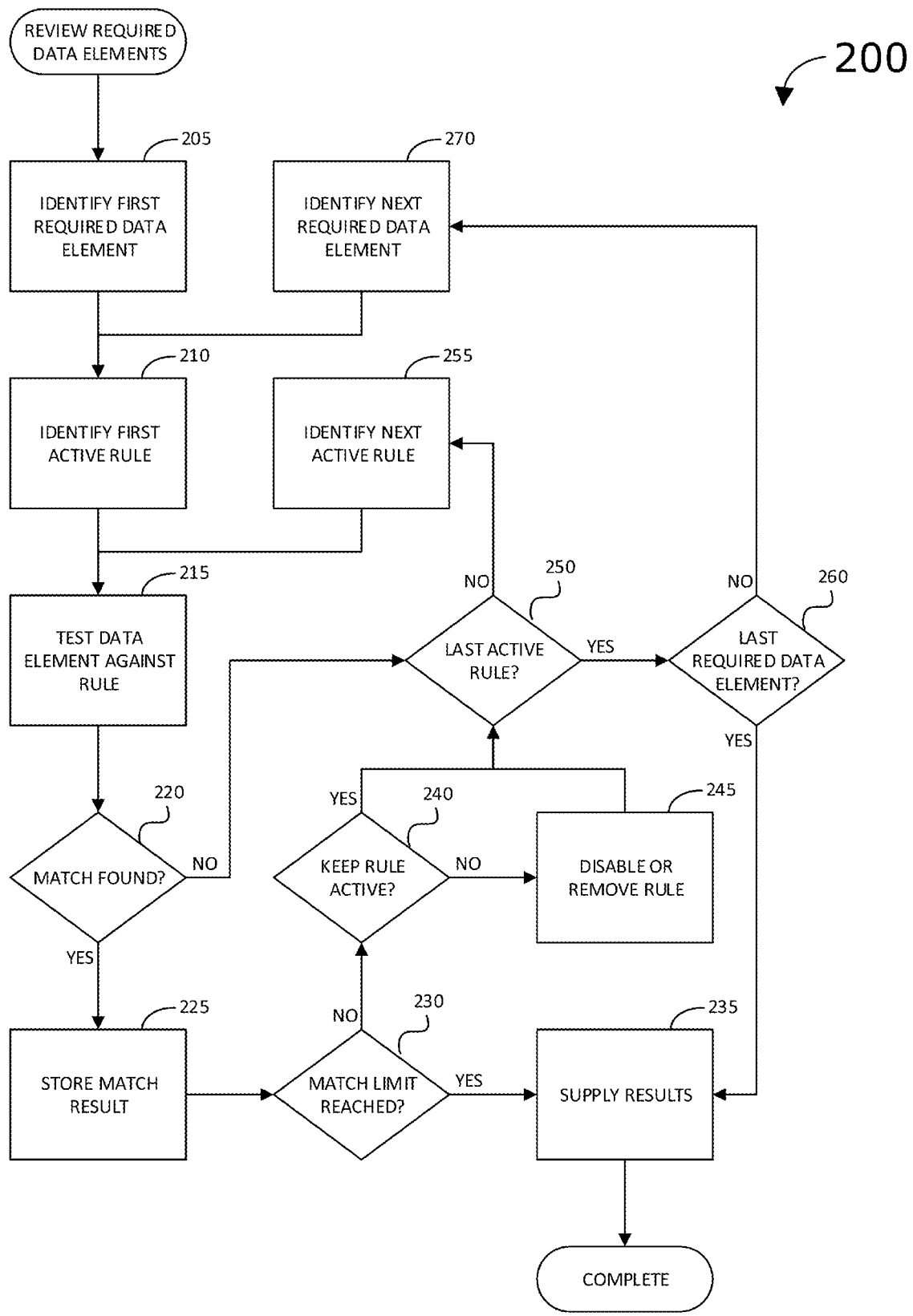
FIG. 2 conceptually illustrates a method for reviewing required data elements of a data container being reviewed to identify PII in the data container in some embodiments.

Turning to another example, FIG. 2 conceptually illustrates a method for reviewing required data elements to identify PII in a data container 200. As noted above, the method for determining whether to review a data container to identify PII in the data container 100 performs a process step to review all the data elements required by the filter results (at 170), which includes several steps for reviewing the required data elements, described here in the method for reviewing required data elements to identify PII in the data container 200. However, it is also noted here that the method for reviewing required data elements to identify PII in the data container 200 may alternatively be performed by the data container interrogation and complex personal identifiable information rule matching data analysis system independent of the process step to review all the data elements required by the filter results (at 170) of the method for determining whether to review a data container to identify PII in the data container 100, described above by reference to FIG. 1.

In some embodiments, the method for reviewing required data elements to identify PII in the data container 200 starts by identifying a first required data element (at 205) in a particular data container (already identified). In some cases, identification of the data element depends on the type of data container. For example, a test file data container would include alpha-numeric textual information and, therefore, data elements may be identified from words, sentences, paragraphs, etc. Many other kinds of data elements are able to be identified, and data containers with mixed types of data elements are also able to be identified and processed against the defined rules. In any event, after identifying the data element, the method for reviewing required data elements to identify PII in the data container 200 of some embodiments identifies a first active rule (at 210) to use in connection with reviewing the identified data element.

After both the data element and the active rule are identified, the method for reviewing required data elements to identify PII in the data container 200 tests the identified data element against the identified active rule (at 215). In some embodiments, the test evaluates rule criteria of the identified rule to the data associated with the identified data element. In some embodiments, the test is a comparison test that compares the data to the rule criteria. In some embodiments, the test is a threshold test to determine whether the data of the data element satisfies, exceeds, or otherwise meets a threshold value provided as rule criteria in the identified active rule.

Based on the results of the test (at 215), the method for reviewing required data elements to identify PII in the data container 200 determines (at 220) whether a match is found. In some embodiments, a match is found when the identified data element satisfies (or 'passes') the test provided by way of the identified rule. In some embodiments, the determination (at 220) of whether or not a match is found results in different operations being performed by method for reviewing required data elements to identify PII in the data container 200.

On the one hand, when a match is found for the determination (at 220), the method for reviewing required data elements to identify PII in the data container 200 stores the match result (at 225), and proceeds forward to a step for determining (at 230) whether a match limit is reached or not, which is described in further detail below. On the other hand, when no match is found for the determination (at 220), the method for reviewing required data elements to identify PII in the data container 200 moves ahead to different operations, starting with a step for determining (at 250) whether the identified active rule is the last active rule or not, and branching out to different subsequent operations that depend on the outcome of the determination (at 250). Specifically, when the identified active rule is determined (at 250) to be the last active rule to use for testing the current identified data element, the method for reviewing required data elements to identify PII in the data container 200 of some embodiments performs a subsequent step for determining (at 260) whether the current identified data element is the last data element to review. In some embodiments, the determination (at 260) is made based on identifying any other required data elements that have not been tested (at 215) from the filtered results of the data container. In some embodiments, the determination (at 260) is made by identification of a logical ending of the data container and the absence of further data elements in the data container. For example, processing of the data container to identify each subsequent data element reaches an end of file element or a last record or cell. The method for reviewing required data elements to identify PII in the data container 200 performs one of two different operations depending on the result of the determination (at 260). The two different operations that depend on the results of the determination (at 260) are described further below.

Turning back to the determination (at 250), when the identified active rule is not the last active rule, the method for reviewing required data elements to identify PII in the data container 200 of some embodiments proceeds to a step for identifying the next active rule (at 255). The rule criteria specified in the next identified active rule is then used by the method for reviewing required data elements to identify PII in the data container 200 to test the identified data element against this 'next' identified active rule (at 215), and proceed accordingly as noted above.

Now referring back to the determination (at 230) of whether the match limit is reached after storing (at 225) the match result, the method for reviewing required data elements to identify PII in the data container 200 of some embodiments performs one of two different steps depending on the whether the match limit is reached or not. A match limit is optionally configured or set to optimize data element/rule test processing when a known finite number of matches would be sufficient. In some embodiments, a match limit of one is configured to minimize data element/rule test processing. For example, a match limit of one would be configured to only require a single rule be matched when compared to the identified data element being tested. A situation in which a single match may be sufficient is when, for example, a data element satisfies rule criteria of a rule that sufficiently satisfies requirements to secure personal identifiable information that may be present as data in the data element (e.g., the data in the data element is AES-256 or SHA-256 encrypted, as required by the identified active rule). In other scenarios, a match limit of a finite number greater than one may be set, such that a plurality of different rules must be matched when comparing to the identified data element. Furthermore, the match limit may be set to 'no match limit' or may not be set to any value at all, thereby rendering no effective match limit for the number of rules that must be matched in comparison to the identified data element before supplying the results.

In particular, when the match limit is affirmatively determined (at 230) to have been reached, the method for reviewing required data elements to identify PII in the data container 200 proceeds to a step for supplying the results (at 235) of the review process for the required data elements, and then ends. On the other hand, when the match limit is not determined (at 230) to have been reached, the method for reviewing required data elements to identify PII in the data container 200 proceeds to a step for determining (at 240) whether to keep the identified active rule as active, or to disable or remove the identified rule.

In some embodiments, when the identified active rule is determined (at 240) to remain active, the method for reviewing required data elements to identify PII in the data container 200 returns to the determination (at 250) of whether the identified active rule is the last active rule or not, as described above. By contrast, when the determination (at 240) is made not to keep the identified active rule as active, the method for reviewing required data elements to identify PII in the data container 200 of some embodiments disables or removes the rule (at 245), and then proceeds to the determination (at 250) of whether the rule (now disabled or removed) is the last active rule or not.

As described above, the method for reviewing required data elements to identify PII in the data container 200 performs one of two different operations depending on the result of the determination (at 260) of whether the current identified data element is the last required data element in the data container or not. When the identified data element is affirmatively determined (at 260) to be the last required data element for rule test processing in the data container, the method for reviewing required data elements to identify PII in the data container 200 proceeds to the step for supplying the results (at 235) of the review of data elements in the data container. Then the method for reviewing required data elements to identify PII in the data container 200 ends. However, when the identified data element is not determined (at 260) to be the last required data element of the data container being reviewed, then method for reviewing required data elements to identify PII in the data container 200 moves ahead with further data element/rule comparison processing. As such, the method for reviewing required data elements to identify PII in the data container 200 proceeds to a step for identifying the next required data element (at 270) in the data container. The subsequent data element/rule comparison processing continues through the steps described above, until the method for reviewing required data elements to identify PII in the data container 200 ends.

When the data elements of a data container have been reviewed (e.g., by the method for reviewing required data elements to identify PII in the data container 200 described above by reference to FIG. 2), the supplied results may indicate that the data container is not sufficiently secured to protect personal identifiable information (PII) in one or more (or all) of the data elements of the data container. In that case, embodiments of the data container interrogation and complex personal identifiable information rule matching data analysis system ensure that the data container is secured. In some embodiments, the data container interrogation and complex personal identifiable information rule matching data analysis system secures the data container by encryption. For example, the data container interrogation and complex personal identifiable information rule matching data analysis system may retrieve or generate an encryption key to apply to the data container and all data elements in the data container. The encryption standard used may vary, so long as the encryption is sufficient for the required security needed. For example, the data container interrogation and complex personal identifiable information rule matching data analysis system may apply SHA-256 or AES-256 encryption standards or a stronger standard (e.g., SHA-512 encryption, etc.). Securing data containers and data elements in the containers by encryption is detailed next, by reference to FIGS. 3-6.

Figure 3:
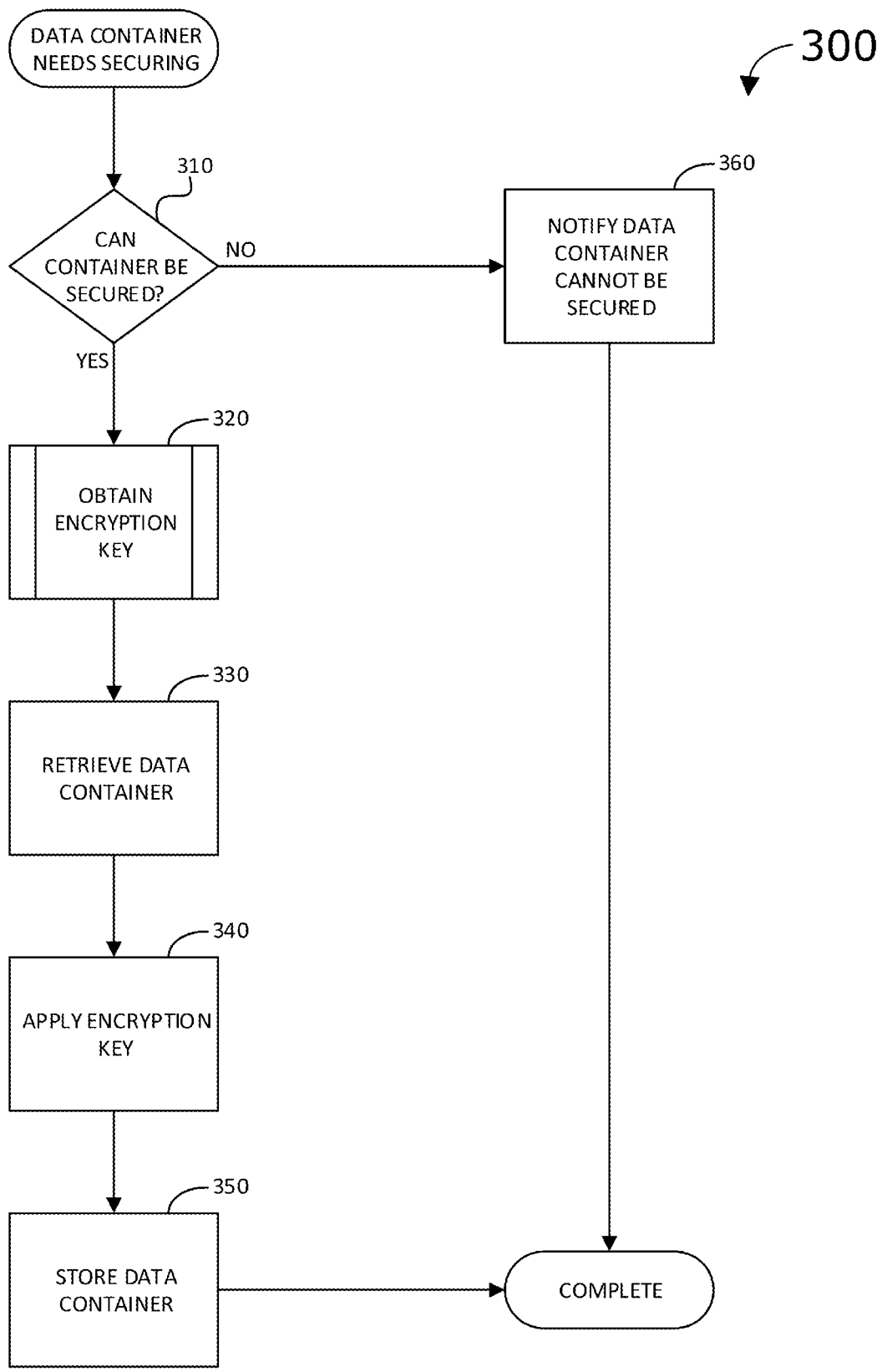
FIG. 3 conceptually illustrates a method for securing a data container in some embodiments.

Referring first to FIG. 3, a method for securing a data container 300 is conceptually illustrated. As shown in this figure, the data container interrogation and complex personal identifiable information rule matching data analysis system triggers the method for securing a data container 300 when a data container needs to be secured. As a threshold operation, the method for securing a data container 300 of some embodiments first determines (at 310) whether the data container can be secured or not. For example, a data container may be related to an application that is configured to reject any form of encryption on the data elements in the container or the data container itself. Thus, when the determination (at 310) is made that the data container cannot be secured, the method for securing a data container 300 of some embodiments provides a notification (at 360) that the data container cannot be secured. Then the method for securing a data container 300 ends.

On the other hand, when the determination (at 310) is made that the data container can be secured, the method for securing a data container 300 of some embodiments proceeds forward to a process step for obtaining an encryption key (at 320). In some embodiments, the process step for obtaining an encryption key (at 320) is carried out by way of one or more steps of a method for obtaining an encryption key for a data container to be secured. In general, the encryption key is obtained by retrieval or generation. Detailed descriptions of the steps of such a method for obtaining an encryption key for a data container to be secured are further described below, by reference to FIG. 4.

After obtaining the encryption key (at 320), the method for securing a data container 300 of some embodiments moves to the next step of retrieving the data container (at 330). Now, with the data container retrieved and the encryption key obtained, the method for securing a data container 300 applies the encryption key to the retrieved data container (at 340). This effectively secures the data container and all data elements within the data container, according to the encryption standard on which the encryption key is based. After securing the data container, the method for securing a data container 300 then stores the secured data container (at 350). Then the method for securing a data container ends.

Figure 4:
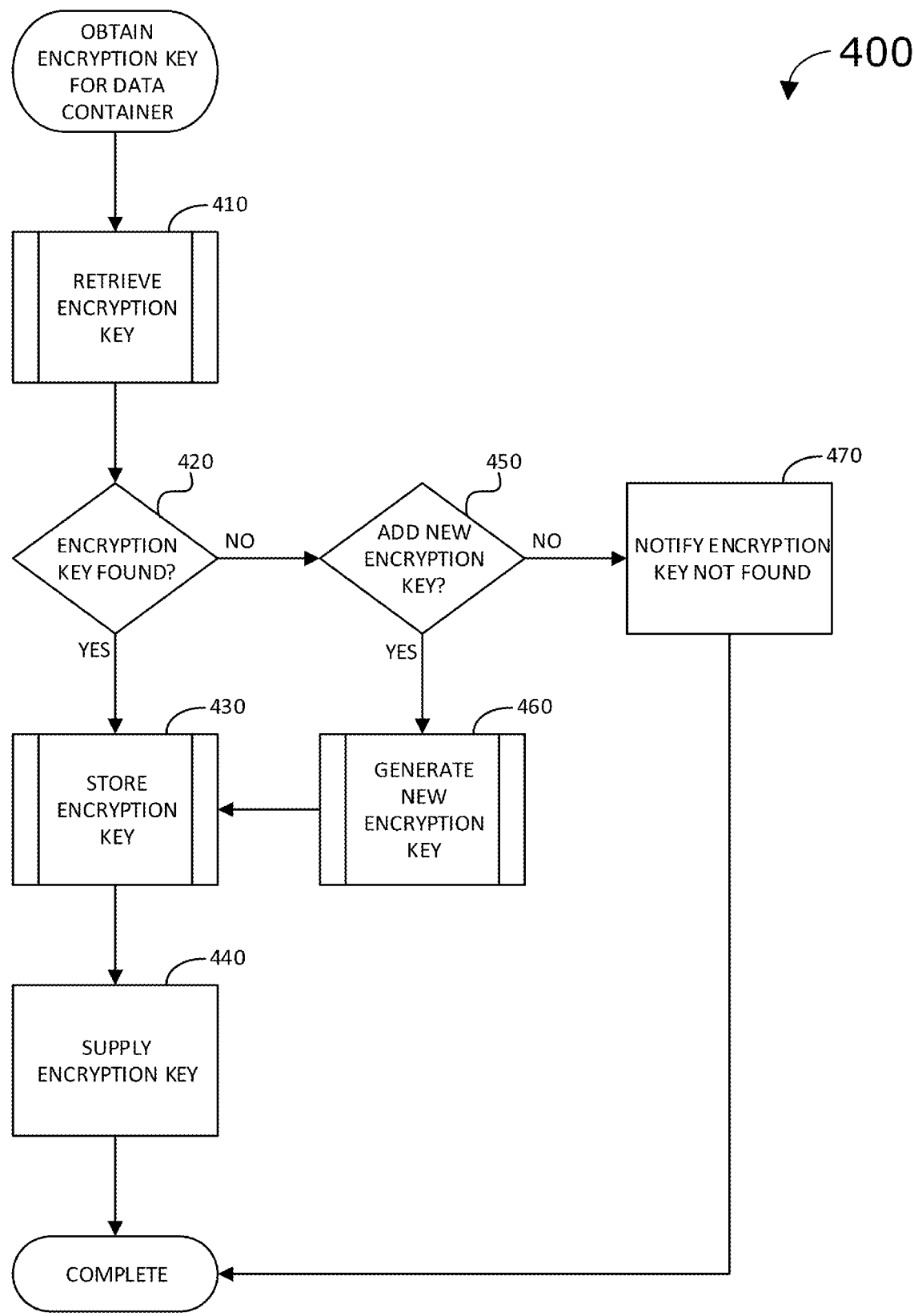
FIG. 4 conceptually illustrates a method for obtaining an encryption key for a data container to be secured in some embodiments.

Now turning to FIG. 4, which conceptually illustrates a method for obtaining an encryption key for a data container to be secured 400. The method for obtaining an encryption key for a data container to be secured 400 shown in this figure exemplifies steps of the process step for obtaining an encryption key (at 320) described above, by reference to FIG. 3, which may be performed by the data container interrogation and complex personal identifiable information rule matching data analysis system when it detects that personal identifiable information (PII) is not secured in a data container.

In some embodiments, the method for obtaining an encryption key for a data container to be secured 400 starts by performing a process step for retrieving an encryption key (at 410). The process step for retrieving an encryption key (at 410) is carried out in several steps of a method for retrieving an encryption key, which is further described below, by reference to FIG. 5. After performing the process step for retrieving the encryption key (at 410), the method for obtaining an encryption key for a data container to be secured 400 moves on to a step for determining (at 420) whether an encryption key was found during the process step for retrieving the encryption key (at 410). When the determination (at 420) is made that no encryption key was found during the process step for retrieving the encryption key (at 410), the method for obtaining an encryption key for a data container to be secured 400 transitions to a step for determining (at 450) whether to add a new encryption key or not. The determination (at 450) of whether to add a new encryption key is further described below.

On the other hand, when the encryption key is affirmatively determined (at 420) to have been found and retrieved, the method for obtaining an encryption key for a data container to be secured 400 proceeds to a step for storing the retrieved encryption key (at 430) as found. In some embodiments, the step for storing the retrieved encryption key (at 430) is a process step to store the encryption key (at 430) that involves several steps of a method for storing the encryption key. The process step to store the encryption key (at 430) is expanded upon in a detailed description of a method for storing the encryption key, described below reference to FIG. 6.

Turning back to the determination (at 450) of whether to add a new encryption key, the method for obtaining an encryption key for a data container to be secured 400 of some embodiments provides a notification (at 470) when the encryption key was determined (at 420) not to be found and when no new encryption key is determined (at 450) to be added. In some embodiments, the provided notification (at 470) indicates that the encryption key was not found or retrieved, and no new encryption is added. After providing the notification (at 470), the method for obtaining an encryption key for a data container to be secured 400 of some embodiments ends.

However, when no encryption key is determined (at 420) to have been found or retrieved, but a new encryption key is affirmatively determined (at 450) to be added, then the method for obtaining an encryption key for a data container to be secured 400 performs a process step for generating the new encryption key (at 460). For example, a new encryption key can be generated according to a secure encryption standard, such as SHA-256 or AES-256, and applied to the data container that needs to be secured. After generating the new encryption key (at 460), the method for obtaining an encryption key for a data container to be secured 400 moves forward to the step for storing the encryption key (at 430). In this case, the encryption key being stored (at 430) is the newly generated encryption key output by the process step for generating the new encryption key (at 460).

Whether the encryption key to use is based on the process step for retrieving the encryption key (at 410) or the process step for generating the new encryption key (at 460), the method for obtaining an encryption key for a data container to be secured 400 moves forward to the next step after storing the encryption key (at 430). Specifically, the method for obtaining an encryption key for a data container to be secured 400 performs a step for supplying the encryption key (at 440) as the resulting output of the processing described above. Then the method for obtaining an encryption key for a data container to be secured 400 ends.

Figure 5:
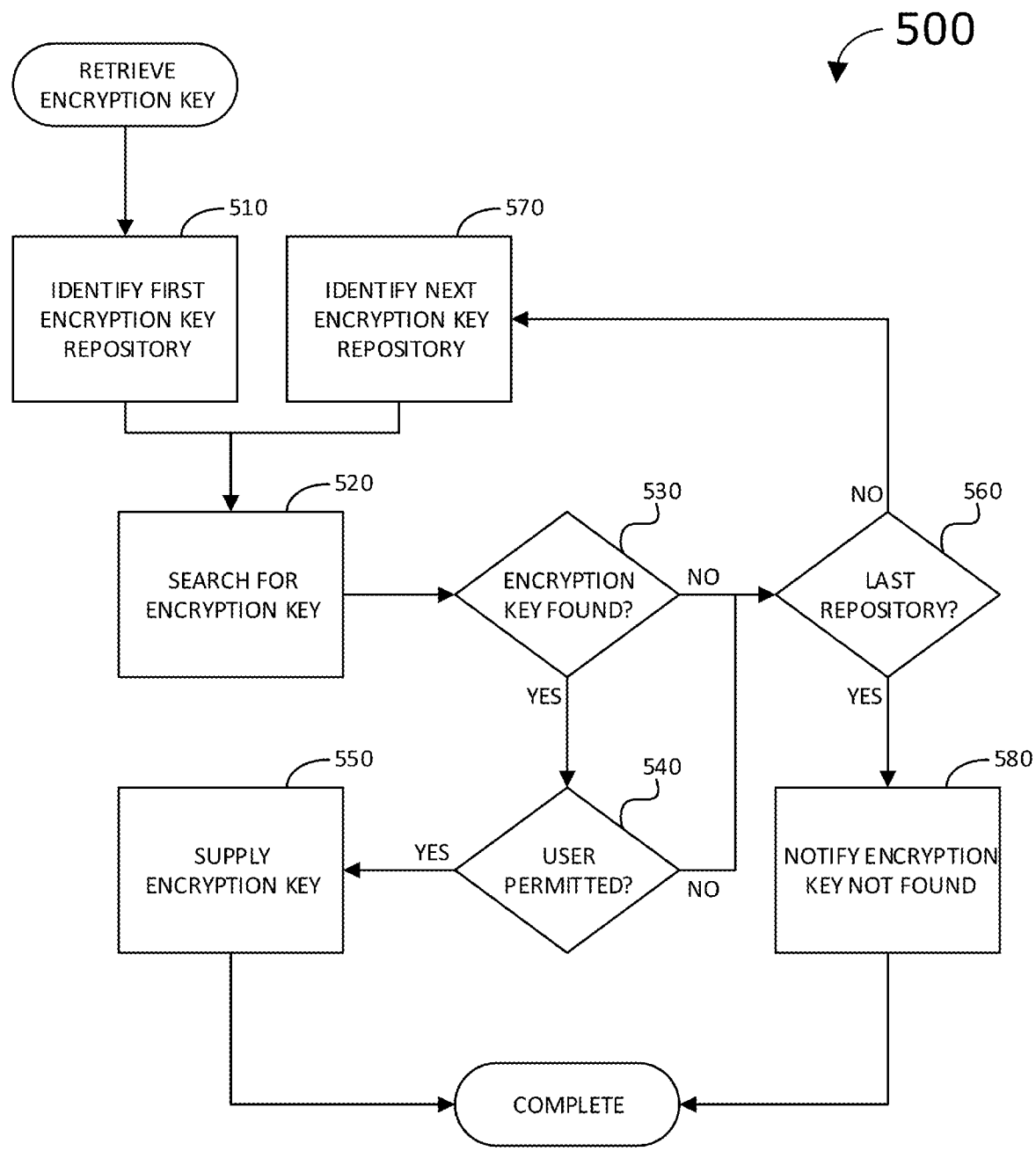
FIG. 5 conceptually illustrates a method for retrieving an encryption key for a data container to be secured in some embodiments.

By reference to another example, FIG. 5 conceptually illustrates a method for retrieving an encryption key 500 for a data container to be secured in some embodiments. The method for retrieving the encryption key 500 shown in this figure demonstrates several steps of the process step for retrieving an encryption key (at 410) in the method for obtaining an encryption key for a data container to be secured 400, described above by reference to FIG. 4, and which may be performed by the data container interrogation and complex personal identifiable information rule matching data analysis system when existing repositories and storage locations are designated to contain encryption keys for use in securing data containers that are not sufficiently secure (e.g., which reveal certain personal identifiable information in one or more data elements within the data container).

In some embodiments, the method for retrieving the encryption key 500 starts by identifying a first encryption key repository (at 510). In some embodiments, the data container interrogation and complex personal identifiable information rule matching data analysis system is configured to store and access encryption keys in one or more repositories or storage locations (hereinafter referred to as "repositories" or individually as "repository"). The repositories or repository may include specific local storage locations that are communicably connected to the data container interrogation and complex personal identifiable information rule matching data analysis system and/or remote storage locations, such as cloud databases, remote server-connected storage, etc., to which the data container interrogation and complex personal identifiable information rule matching data analysis system is configured to connect to in order to check (search) each repository, access any identified encryption key, and retrieve the encryption key when available. Similarly, the encryption repositories may be identified in a data file, a database, a spreadsheet, a folder location on a computing device hard drive, or any other structured location capable of storing an encryption key. For example, a spreadsheet may include several different sheets, each sheet being a known encryption key repository with one or more encryption keys that may be accessed by the data container interrogation and complex personal identifiable information rule matching data analysis system.

After identifying the first encryption key repository (at 510), the method for retrieving the encryption key 500 of some embodiments transitions to a step for searching for an encryption key (at 520) in the identified repository. In some embodiments, the method for retrieving the encryption key 500 then performs a step for determining (at 530) whether an encryption key was found in the identified repository. When no encryption key is found in the identified repository, the method for retrieving the encryption key 500 moves forward to a step for determining (at 560) whether the identified repository is the last repository in which to search for an encryption key. Further details for determining (at 560) whether there are more repositories to search for encryption keys or not are described below.

On the other hand, when an encryption key is affirmatively determined (at 530) to have been found while searching (at 520) in the current identified repository, then the method for retrieving an encryption key 500 transitions to a step for determining (at 540) whether the user is permitted to use the encryption key found in the identified repository or not. When the determination (at 540) is made that the user is not permitted to use the encryption key found in the identified repository, the method for retrieving an encryption key 500 moves forward to the step for determining (at 560) whether the identified repository is the last repository in which to search for an encryption key, which is further described below. By contrast, when an affirmative determination (at 540) is made that the user is permitted to use the encryption key found in the identified repository, the method for retrieving an encryption key 500 proceeds to the next step of supplying the encryption key (at 550) as output of the retrieval processing steps described above. Then the method for retrieving the encryption key 500 ends.

Turning back to the determination (at 560) of whether the identified repository is the last repository in which to search for an encryption key, when the identified repository is affirmatively determined (at 560) to be the last repository, then the method for retrieving the encryption key 500 provides a notification (at 580) that no encryption key was not found and, therefore, no encryption key was retrieved. On the other hand, when the identified repository is not determined (at 560) to be the last repository in which to search for an encryption key, the method for retrieving the encryption key 500 moves forward to a step for identifying the next encryption key repository (at 570). After identifying the next encryption key repository (at 570), the method for retrieving the encryption key 500 proceeds through the steps noted above after the identification of the first encryption key repository (at 510). In some embodiments, the method for retrieving the encryption key 500 completes several rounds of processing the steps of identifying the next encryption key repository (at 570), searching for an encryption key within the repository (at 520), and performing other related decisions before finally searching (at 520) and finding (at 530) a user-permitted encryption key (at 540) and supplying the encryption key (at 550) as output (and then ending) or exhausting the available repositories to identify (at 570) for the search (at 520) to check for available, user-permitted encryption keys and, when none found, providing the notification that no encryption key was found (at 580), and ultimately ending.

Figure 6:
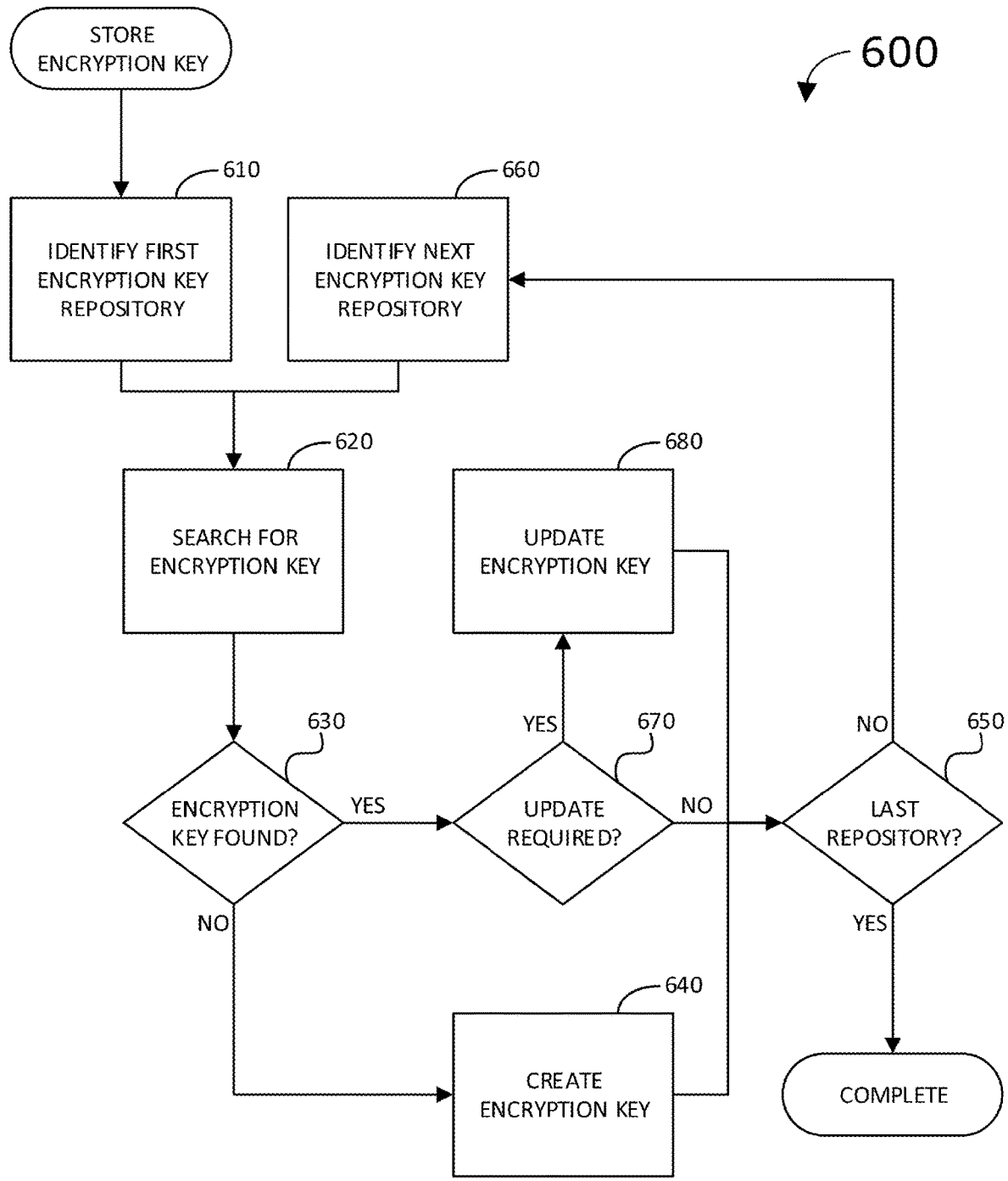
FIG. 6 conceptually illustrates a method for storing an encryption key obtained (retrieved or generated) for a data container to be secured in some embodiments.

By way of example, FIG. 6 conceptually illustrates a method for storing an encryption key 600 that was obtained (retrieved or generated) to secure a data container in some embodiments. The method for storing the encryption key 600 shown in this figure demonstrates several steps of the process step to store the encryption key (at 430) in the method for obtaining an encryption key for a data container to be secured 400, described above by reference to FIG. 4, and which may be performed by the data container interrogation and complex personal identifiable information rule matching data analysis system when the encryption key is either retrieved from an existing repository or generated as a new encryption key to secure the data container.

In some embodiments, the method for storing the encryption key 600 starts by identifying a first encryption key repository (at 610) in which the encryption key may be stored. In particular, the data container interrogation and complex personal identifiable information rule matching data analysis system may be configured with multiple encryption key storage locations or repositories that are sequentially checked by the method for storing the encryption key 600. In some embodiments, each encryption key repository that includes at least one encryption key is associated with at least one particular data container. In some embodiments, the particular data container is identifiable by information that links the encryption key to the particular data container and is provided as an encoded data record that is retrievable from the encryption key repository.

Next, after the first encryption key repository is identified, the method for storing the encryption key 600 performs a step for searching for the encryption key (at 620) in the identified encryption key repository. The method for storing the encryption key 600 of some embodiments then moves ahead to a step for determining (at 630) whether the encryption key is found in the identified encryption key repository or not. In some embodiments, the encryption key to be stored is compared to one or more encryption keys found during the search for the encryption key (at 620) in the identified encryption key repository. In some embodiments, the data container associated with the encryption key to be stored is identified and compared to the particular data container linked to each encryption key in the repository, as retrieved and decoded. In some embodiments, the method for storing the encryption key 600 compares every encryption key found in the identified encryption key repository until a match is identified or no match is made among all encryption keys in the repository. Thus, when a determination (at 630) is made that the encryption key is not found in the identified repository, the method for storing the encryption key 600 then moves ahead to a step for creating (at 640) the encryption key in the identified repository, which is followed by a step for determining (at 650) whether the identified repository is the last repository or not. The determination (at 650) of whether the identified repository is the last repository is described further below.

On the other hand, when the encryption key is determined (at 630) to be affirmatively found in the identified encryption key repository, the method for storing the encryption key 600 of some embodiments performs a steps for determining (at 670) whether to update the encryption key found in the identified repository or not. For example, a new passcode was used in connection with a more secure encryption standard to generate the encryption key as compared to an old encryption key used to (insufficiently) secure the data container. When no update is determined (at 670) to be required for the encryption key found in the identified repository, the method for storing the encryption key 600 transitions to the step for determining (at 650) whether the identified encryption key repository is the last repository, which is further described below. On the other hand, when an update is determined (at 670) to be required for the encryption key found in the identified repository, the method for storing the encryption key 600 then performs a step for updating the encryption key (at 680) in the identified encryption key repository with the generated or retrieved encryption key that is intended to be stored. After updating the encryption key (at 680) in the identified repository, the method for storing the encryption key 600 moves on to the step for determining (at 650) whether the identified encryption key repository is the last repository or not. When the identified repository is not determined (at 650) to be the last repository, the method for storing the encryption key 600 moves on to a step for identifying (at 660) the next encryption key repository, and continues through the steps of the method for storing the encryption key 600 as noted above. On the other hand, when the identified encryption key repository is determined (at 650) to be the last repository, then the method for storing the encryption key 600 ends.

Figure 7:
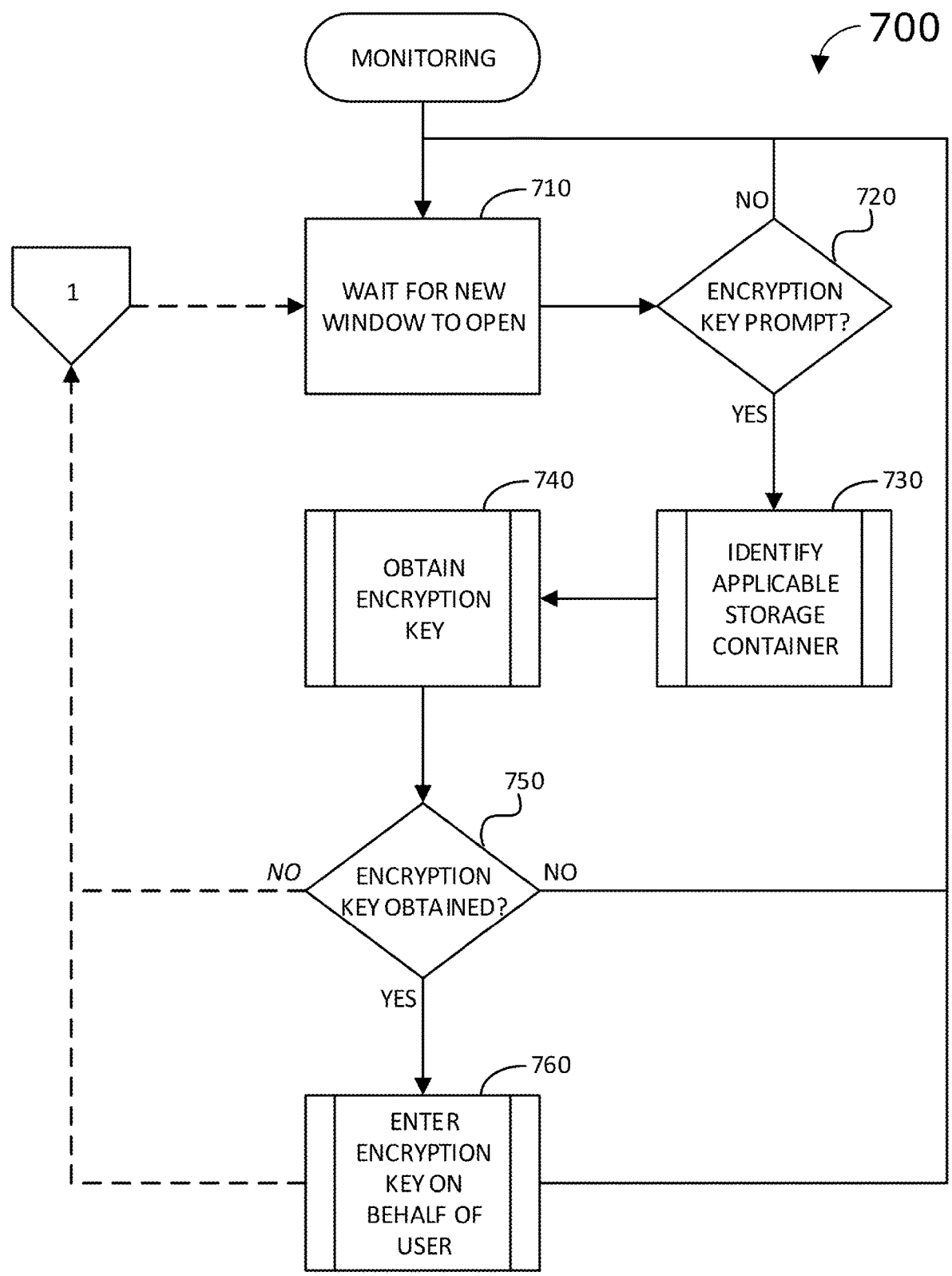
FIG. 7 conceptually illustrates a monitoring method for opening a data container in some embodiments.

By way of example, FIG. 7 conceptually illustrates a monitoring method 700 for opening a data container in some embodiments. The monitoring method 700 may be performed by a computing device running a software application that implements one or more of the methods for identifying personal identifiable information (PII) in a data container, such as those methods described above, by references to FIGS. 1-6, and/or other methods described below, by reference to FIGS. 8, 10, and 11, or otherwise performed by the data container interrogation and complex personal identifiable information rule matching data analysis system.

In some embodiments, the monitoring method 700 for opening a data container is performed in a listener mode by the data container interrogation and complex personal identifiable information rule matching data analysis system. When in the listener mode, the monitoring method 700 waits until an operation is detected to open a new window (at 710). For example, a new window that is opened may be detected as being related to a data container, which may include personal identifiable information required to be secured.

In some embodiments, when a new window is detected to be opened, the monitoring method 700 for opening a data container determines (at 720) whether the new window includes an encryption key prompt or not. When the new window being opened is not determined (at 720) to have such an encryption key prompt, the monitoring method 700 returns to the listener mode, waiting for another new window to be opened (at 710). By contrast, when the encryption key prompt is determined (at 720) to be provided in connection with the new window, the monitoring method 700 for opening a data container proceeds to a process step for identifying an applicable storage container (at 730).

After identifying an applicable storage container, the monitoring method 700 of some embodiments performs a process step for obtaining the encryption key (at 740) for the identified storage container. The process step for obtaining the encryption key (at 740) may involve several sequential steps that are not shown in this figure. For example, the process step for obtaining the encryption key (at 740) may be completed by following the steps of the method for obtaining an encryption key for a data container to be secured 400, described above by reference to FIG. 4.

In some embodiments, the monitoring method 700 for opening a data container then moves forward to a step for determining (at 750) whether the encryption key was obtained from the identified applicable storage container or not. When the encryption key is determined (at 750) not to have been obtained from the identified applicable storage container, the monitoring method 700 of some embodiments returns to the listener mode to wait (at 710) for an operation of opening a new window. In some embodiments, the monitoring method 700 also allows an encryption key to be entered when no encryption key is obtained from the identified applicable storage container (see the marker "1" symbol that corresponds the marker "1" symbol shown in FIG. 9). In that case, the data container may be opened upon entry of an encryption key. This is further described below, by reference to FIG. 9.

On the other hand, when an affirmative determination (at 750) is made that the encryption key was obtained from the identified applicable storage container, then the monitoring method 700 for opening a data container proceeds forward to a process step for entering the encryption key on behalf of the user (at 760). The process step for entering the encryption key on behalf of the user (at 760) may involve several sub-steps that are performed to enter the encryption key on behalf of the user. An example of several steps (or sub-steps) that may be performed by the process step for entering the encryption key on behalf of the user (at 760) is described further below, by reference to FIG. 8. After completing the process step for entering the encryption key on behalf of the user (at 760), the monitoring method 700 for opening a data container returns to the listener mode to wait (at 710) for a new window to open and proceeds accordingly.

As indicated, the process step for entering the encryption key on behalf of the user (at 760), described above by reference to FIG. 7, may involve several steps or sub-steps that are performed to enter the encryption key on behalf of the user. The following example demonstrates this. Specifically, and by way of reference, FIG. 8 conceptually illustrates a method for entering an encryption key on behalf of a user 800.

In some embodiments, the method for entering an encryption key on behalf of a user 800 starts by identifying an encryption key entry field (at 810). For example, when a new open window is detected and checked to determine if an encryption key prompt is presented for access to the contents of the data container associated with the new open window, as described above by reference to FIG. 7. In some embodiments, the method for entering an encryption key on behalf of a user 800 then performs a step for determining (at 820) whether the identified encryption key entry field can be set directly or not. When direct setting of the identified encryption key entry field is determined (at 820) to be possible, the method for entering an encryption key on behalf of a user 800 continues forward to the next step for setting the field value to the encryption key (at 830) and then returning control to the user (at 840).

On the other hand, when direct setting of the identified encryption key entry field is not determined (at 820) to be possible, the method for entering an encryption key on behalf of a user 800 proceeds to a different step for selecting (at 850) the identified encryption key entry field and then identifying (at 860) the first character of the encryption key. In some embodiments, the method for entering an encryption key on behalf of a user 800 then performs a step for simulating (at 870) keyboard entry of the identified character. For example, a simulated entry of a first character of the encryption key may include visually outputting a symbol, such as a "*" character, and symbolically simulating entry of all characters of the encryption key by visually outputting "*" characters for all encryption key characters. In doing this, the method for entering an encryption key on behalf of a user 800 continues with a step for determining (at 880) whether the identified character is the last character of the encryption key or not. When the identified character is determined (at 880) to be the last character of the encryption key, the method for entering the encryption key on behalf of the user 800 transitions to the step for returning control to the user (at 840). Then the method for entering an encryption key on behalf of a user 800 ends. However, when the identified character is not determined (at 880) to be the last character of the encryption key, then the method for entering the encryption key on behalf of the user 800 of some embodiments continues to process the encryption key by performing a step for identifying (890) the next character of the encryption key. The method for entering an encryption key on behalf of a user 800 then proceeds accordingly through the steps noted above until the last character of the encryption key is identified, set and/or simulated as keyboard entry, followed by returning control to the user and ending.

Figure 9:
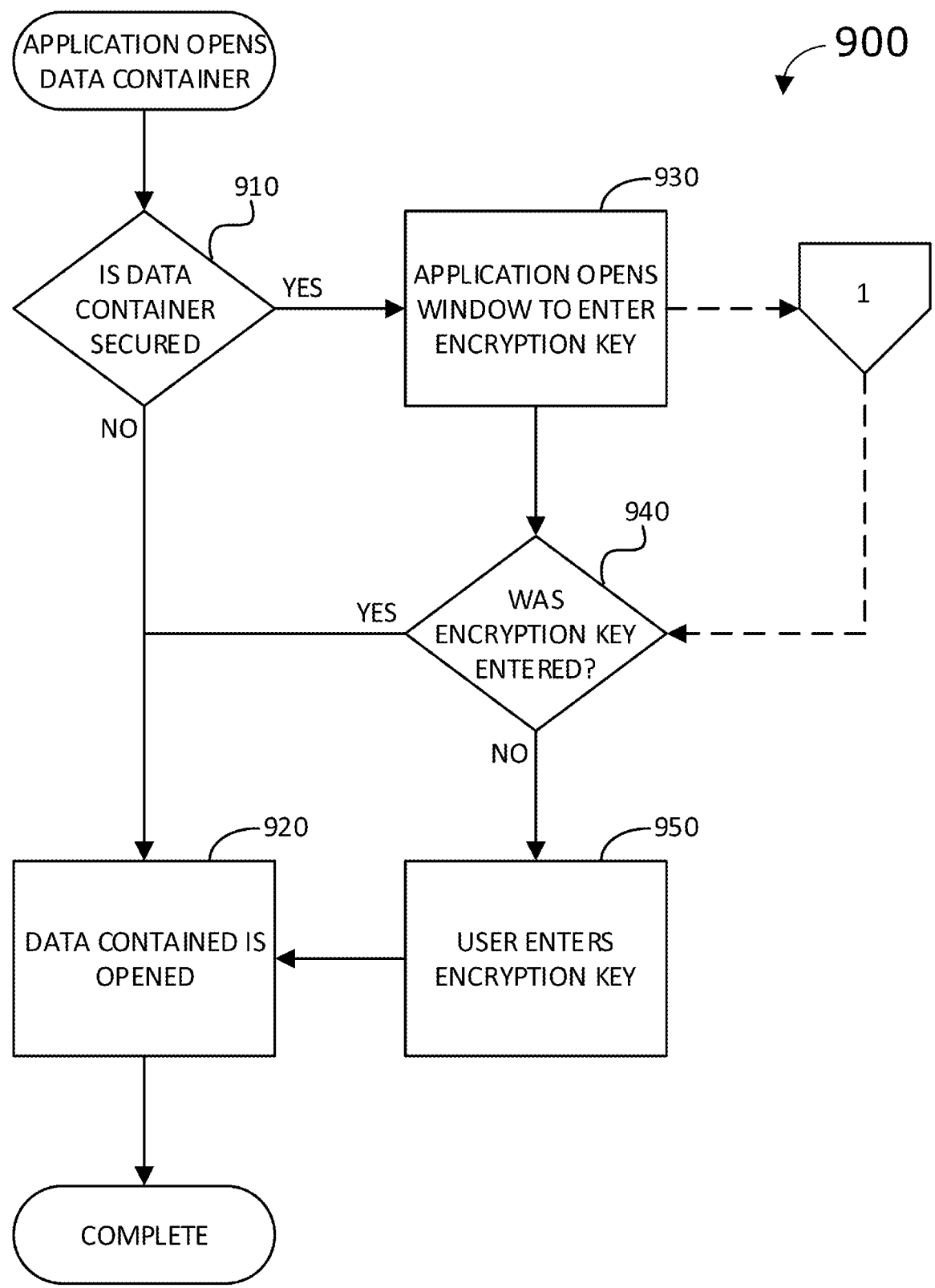
FIG. 9 conceptually illustrates an application method for opening a data container in some embodiments.

In connection with the monitoring method 700 for opening a data container, described above by reference to FIG. 7, and by way of example, FIG. 9 conceptually illustrates an application method 900 for opening a data container in some embodiments. Specifically, when the monitoring method 700 described for FIG. 7 allows an encryption key to be entered when no encryption key is obtained from the identified applicable storage container, a link to the application method 900 of FIG. 9 is established (shown in this figure by the marker "1" symbol and dashed lines that corresponds the marker "1" symbol shown in FIG. 7). However, when the application method 900 is performed independently, the application method 900 of some embodiments starts when a particular application attempts to open a data container. In some embodiments, the application method 900 first performs a step for determining (at 910) whether the data container is secured or not. When the data container is determined (at 910) to be secured (i.e., by an encryption key created by a sufficient encryption standard), the application method 900 of some embodiments proceeds to a step at which the application opens the window to enter the encryption key (at 930). Following the dashed line to marker "1" and referring back to FIG. 7, the step for waiting (at 710) in the listener mode is related to the step in FIG. 9 in which the application opens the window to enter the encryption key (at 930). In this way, when the application opens the window to enter the encryption key (at 930), the listener at the waiting step (at 710) is then triggered to determine (at 720) whether the encryption key input prompt is output, and carry out the subsequent steps noted above, by reference to FIG. 7. In that case, and now referring back to FIG. 9, the application method 900 performs a step for determining (at 940) whether the encryption key was entered (at the prompt, for instance). When the encryption key is determined (at 940) to have been accurately entered, the application method 900 transitions to a step for opening the data container (at 920). However, when no encryption key is entered or an inaccurate encryption key entered, the determination (at 940) is followed by a step at which the user enters the encryption key (at 950). In this way, even when entry of the encryption key on behalf of the user fails or is not possible, there is an alternative, interactive way for the user to provide the encryption key manually in order to proceed to the step at which the data contained in the data container is opened (at 920). Then the application method 900 ends.

Figure 10:
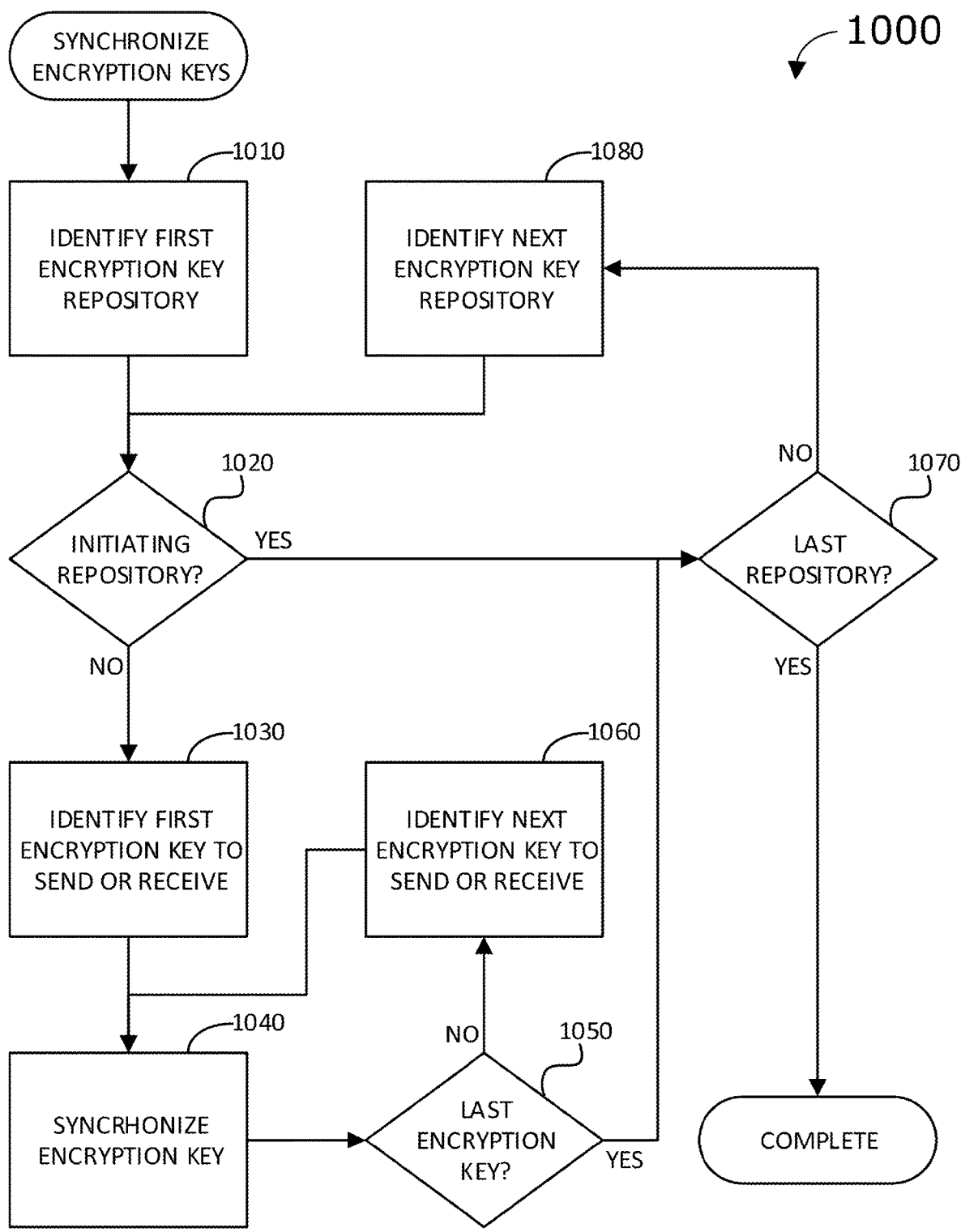
FIG. 10 conceptually illustrates a method for synchronizing encryption keys in some embodiments.

By way of another example, FIG. 10 conceptually illustrates a method for synchronizing encryption keys 1000. As shown in this figure, the method for synchronizing encryption keys 1000 starts by identifying a first encryption key repository (at 1010), followed by determining (at 1020) whether the identified repository is the initiating repository or not. When the identified repository is determined (at 1020) to be the initiating repository, the method for synchronizing encryption keys 1000 proceeds to a step for determining (at 1070) whether the identified repository is the last repository or not. When the identified repository is not determined (at 1070) to be the last repository, the method for synchronizing encryption keys 1000 moves ahead to a step for identifying (at 1080) the next encryption key repository and continues forward, as noted above. However, when the identified repository is affirmatively determined (at 1070) to be the last repository, the method for synchronizing encryption keys 1000 ends.

Turning back to the determination (1020) of whether the identified repository is the initiating repository, the method for synchronizing encryption keys 1000 performs a different step for identifying (at 1030) the first encryption key to send or receive when the identified repository is not the initiating repository. Next, the method for synchronizing encryption keys 1000 goes forward with synchronizing (at 1040) the encryption key. After synchronizing the encryption key (at 1040), the method for synchronizing encryption keys 1000 performs a step for determining (at 1050) whether the identified encryption key is the last encryption key or not. When the identified encryption key is determined (at 1050) to be the last encryption key, the method for synchronizing encryption keys 1000 transitions to the step for determining (at 1070) whether the identified repository is the last repository, as described above. On the other hand, when the identified encryption key is not determined (at 1050) to be the last encryption key, the method for synchronizing encryption keys 1000 proceeds to another step for identifying (at 1060) the next encryption key to send or receive, followed by the step for synchronizing the encryption key (at 1040), and thereafter performing the subsequent steps as outlined above. In some embodiments, the method for synchronizing encryption keys 1000 ends after the identified repository is determined (at 1070) to be the last repository.

II. Detailed Method for Identifying Personal Identifiable Information (PII) in a Data Container In some embodiments, the data container interrogation and complex personal identifiable information rule matching data analysis system performs a detailed method for the identification of personal identifiable information (PII) in a data container.

Figure 11:
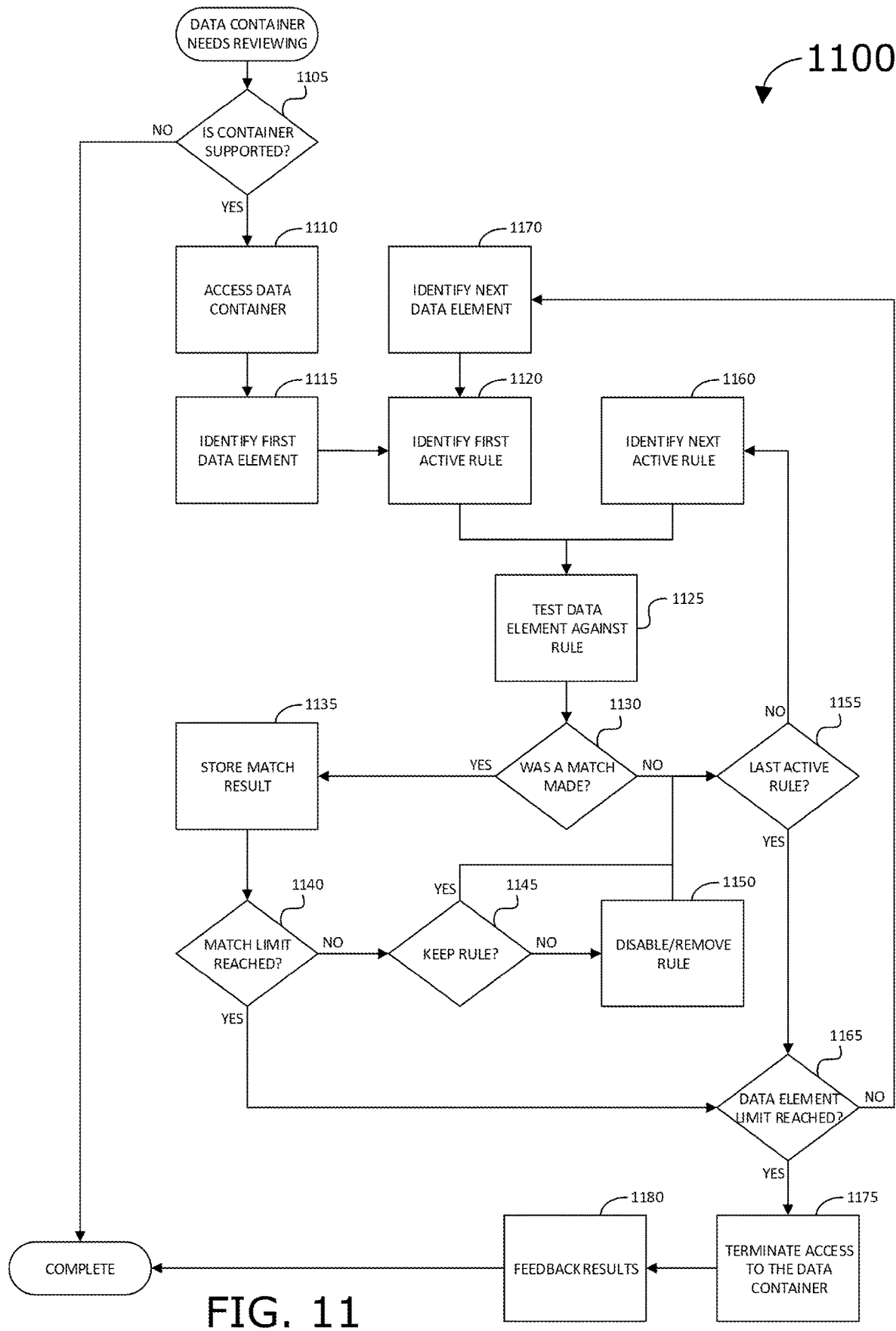
FIG. 11 conceptually illustrates a detailed method for the identification of personal identifiable information (PII) in a data container in some embodiments.

By way of example, FIG. 11 conceptually illustrates a detailed method for the identification of personal identifiable information (PII) in a data container 1100. As show in this figure, the detailed method for the identification of PII in a data container 1100 starts out by determining (at 1105) whether the data container is supported or not. In some embodiments, the determination of whether the provided data container is supported or not is based on the type of data container that is provided. For example, the data container may be a file, a spreadsheet with data, a database table, or another database structure that stores data in an organized manner. In some embodiments, the determination is made based on the type of data containers that are supported by an analysis engine of the data container interrogation and complex personal identifiable information rule matching data analysis system. Furthermore, support could be qualified by the type of file and any access permissions that may be present. In the event the data container is not supported, the operation will complete with no further actions. Thus, when the data container is determined (at 1105) not to be supported, the detailed method for the identification of PII in a data container 1100 ends.

On the other hand, when the data container is determined (at 1105) to be supported, the detailed method for the identification of PII in a data container 1100 accesses the data container (at 1110). In some embodiments, accessing the data container (at 1110) is performed by establishing a connection to the data container, such as by opening the data container file or spreadsheet, or connecting to the data container database or database table. In some embodiments, access requirements to the data container are evaluated prior to, or in conjunction with, accessing the data container (at 1110). Successfully accessing the data container (at 1110) is then contingent upon satisfying the access requirements so that access will be permitted without further issue.

After accessing the supported data container, the detailed method for the identification of PII in a data container 1100 identifies the first data element (at 1115) in the provided data container. In some embodiments, the manner of identifying the first data element (at 1115) of the data container depends on the type of data container (e.g., file, spreadsheet, database, database table, other database structure, etc.) that is accessed (at 1110) by the detailed method for the identification of PII in a data container 1100. Examples of applicable data elements include, without limitation, a cell within an electronic spreadsheet, a word in an electronic word-processing document ("document") or text file, a sentence in a document or text file, a paragraph within a document or text file, or a field within a database, a record in a database table, an object stored in an object-oriented database, metadata within a metadata-rich file (such as an XML file, an HTML file, etc.), and/or other customized units of data in custom data containers, etc.

After identifying the first data element, the detailed method for the identification of PII in a data container 1100 identifies the first active rule (at 1120) to process in connection with the identified data element, and then tests the identified data element against the identified active rule (at 1125). For example, the identified first rule may include rule criteria with which to test any data element. Thus, after the first data element and the first active rule are identified, the detailed method for the identification of PII in a data container 1100 tests the identified data element to see if the rule criteria within the identified active rule are met.

Next, the detailed method for the identification of PII in a data container 1100 determines (at 1130) whether a match is made when testing the identified data element against the rule criteria specified for the identified first active rule or not. In some embodiments, when no match is made, the detailed method for the identification of PII in a data container 1100 determines (at 1155) whether the identified active rule is the last active rule or not. The step of determining (at 1155) whether the identified active rule is the last active rule is described in further detail below. On the other hand, when the identified data element satisfies the rule criteria, then the detailed method for the identification of PII in a data container 1100 determines (at 1130) that there is a match made. In that scenario, the detailed method for the identification of PII in a data container 1100 stores the match results (at 1135). In some embodiments, the match results include details of the match that is determined by the detailed method for the identification of PII in a data container 1100. In some embodiments, the details of the match between the identified active rule (rule criteria) and the identified data element can be made available to provide immediate feedback about the data element and/or the active rule or rule criteria. Alternatively, or in conjunction with providing the immediate feedback, the detailed method for the identification of PII in a data container 1100 could store the match results for analysis at a later time.

After storing the match results (at 1135), the detailed method for the identification of PII in a data container 1100 determines (at 1140) whether a match limit is reached or not. For example, some scenarios may only demand that a single rule be matched for the identified data element being tested, or that a plurality of rules be matched before the next data element is reviewed. When the match limit is determined (at 1140) to have been reached, the detailed method for the identification of PII in a data container 1100 proceeds to a determination (at 1165) of whether a data element limit is reached or not. Further details of the determination (at 1165) of whether the data element limit is reached are described below. By contrast, when the match limit is not determined (at 1140) to be reached, the detailed method for the identification of PII in a data container 1100 of some embodiments proceeds to a step for determining (at 1145) whether to keep the identified active rule or not. Specifically, a determination (at 1145) is made by the detailed method for the identification of PII in a data container 1100 as to whether the identified active rule should be kept for later to be used to evaluate/test other data elements within the same data container. In some embodiments, when the identified active rule is kept (with the intention of using the rule later to test other data elements of the data container), the detailed method for the identification of PII in a data container 1100 then determines (at 1155) whether the identified active rule is the last active rule. This step considers whether the present rule (the identified active rule) is the last active rule that the current identified data element should be compared to/tested against.

Turning back to the determination (at 1145), when the identified active rule is not determined to be kept, then it will be removed or disabled. That is, the detailed method for the identification of PII in a data container 1100 disables or removes the identified active rule (at 1150), such that the rule will not be used in testing other data elements of the identified data container. Specifically, if the same rule should not be used to match multiple data elements within the same container, then the determination (at 1145) is made to inactivate the identified rule by removing or disabling the rule (at 1150). This satisfies uses cases where only a single instance of a particular rule matching a data element in a data container is required, and serves to improve the performance of additional data element testing, by reducing the number of rules to be evaluated against. After removing/disabling the identified rule (at 1150), the detailed method for the identification of PII in a data container 1100 proceeds to the determination (at 1155) of whether the identified disabled/removed rule is the last active rule or not, as described above.

In some embodiments, when the identified rule (either the identified active rule following a decision to keep the rule or the identified removed/disabled rule following a decision not to keep the rule) is determined (at 1155) to be the last active rule, the detailed method for the identification of PII in a data container 1100 of some embodiments proceeds to a step for determining whether a data element limit is reached or not (at 1165), which is described in further detail below. On the other hand, when the identified rule (either the identified active rule following a decision to keep the rule or the identified removed/disabled rule following a decision not to keep the rule) is not determined (at 1155) to be the last active rule, then detailed method for the identification of PII in a data container 1100 moves forward to the next step of identifying (at 1160) the next active rule that the current identified data element should be compared against, and proceed through the steps starting with the testing (at 1125) of the data element against the newly identified (next) active rule.

Now, the determination (at 1165) of whether the data element is reached is considered by the detailed method for the identification of PII in a data container 1100 after the identified active rule is affirmatively determined (at 1155) to be the last active rule. In particular, the detailed method for the identification of PII in a data container 1100 determines (at 1165) whether the current identified data element is the last data element to be evaluated against the rule criteria specified in the identified active rule. When the current identified data element actually is the last data element to be examined, the detailed method for the identification of PII in a data container 1100 proceeds to a step for terminating access to the data container (at 1175), which is described in further detail below. On the other hand, when the current identified data element is not determined (at 1165) to be the last data element to be examined, the detailed method for the identification of PII in a data container 1100 moves forward to a step for identifying the next data element (at 1170) in the data container. For example, in many cases, the last data element in the data container would be the end of the file (when the data container is a file) or end of a database table (when the data container is a database or database table). In some other situations, however, constraints dictate the processing of the data elements by the detailed method for the identification of PII in a data container 1100. For instance, there may be scenarios whereby only a set number of elements should be evaluated (e.g., the first 100 data elements in the data container). Thus, the detailed method for the identification of PII in a data container 1100 goes beyond a cursory evaluation of determining whether the end of the file is reached or end of the database table is reached, and includes consideration of any and all constraints that may impact the evaluation of a number of data elements, types of data elements, or other such qualifications that may render an end of the data elements for which the detailed method for the identification of PII in a data container 1100 is configured to test against one or more of the active rules. Thus, after the determination (at 1165) is made and the data element limit is not reached, the detailed method for the identification of PII in a data container 1100 proceeds to identify the next data element (at 1170) in the data container and continues forward through the several steps noted above, namely, identifying the first active rule at 1120 for the currently identified (next) data element, testing the currently identified (next) data element against the first active rule, and so on. By contrast, when the data element limit is determined (at 1165) to have been reached, then the detailed method for the identification of PII in a data container 1100 terminates the access to the data container (at 1175) and goes on to provide feedback on the results (at 1180) of the analysis performed. Then the detailed method for the identification of PII in a data container 1100 ends.

The various steps of the detailed method for the identification of PII in a data container 1100 may be related in the following exemplary fashion. It is not intended to limit the scope or nature of the relationships between the various steps and the following examples are presented as illustrative examples only. The steps detail how the detailed method for the identification of PII in a data container 1100 would work in a serial fashion; however, it is possible to configure an application that implements the detailed method for the identification of PII in a data container 1100 to perform the rule testing operations in parallel, whereby the step for identifying the first active rule (at 1120) would rather identify all rules that are active for testing data elements in the data container. Also, for all of the identified rules (among conceivably several simultaneously or contemporaneously identified rules), the determination (at 1130) of whether a match is made (in each case), followed by the steps for storing match results (at 1135), determining whether match limit is reached (at 1140), determining whether to keep the (each) identified rule (at 1145), and any instances of disabling/removing the rule (at 1150), would be performed in parallel, thereby leading the detailed method for the identification of PII in a data container 1100 to arrive at the determination (at 1165) of whether the data element limit has been reached, after all of the data element/active rule testing has been completed. Furthermore, using the same logic, it is possible for all data elements to be evaluated in parallel, whereby the operations for identifying the first data element (at 1115) actually performs a serial identification of all of the data elements in the data container, and for each data element, the operations for identifying the active rules (at 1120), testing each data element against each rule (at 1125), determining whether matches are made (at 1130), storing the match results (at 1135) if any, determining whether the match limit (for each data element) has been reached (at 1140), determining whether to keep (each) rule (at 145), disabling or removing any such rule (at 1150), determining whether each rule is the last active rule (at 1155), and determining whether the data element limit is reached (at 1165) for each, would be performed in parallel, leading to the operation for terminating access to the data container (at 1175) and providing the feedback results (at 1180) of the testing, which would be triggered after such parallel testing has been completed.

The results produced by the detailed method for the identification of PII in a data container 1100 (and the other methods, described above by reference to FIGS. 1-10) allow for further action to be taken to secure the data container, as needed or as preferred. When used together with an application that can automatically take appropriate action, this allows organizations to further enhance their security posture, reduce risk of data exposure, and drive peace-of-mind.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
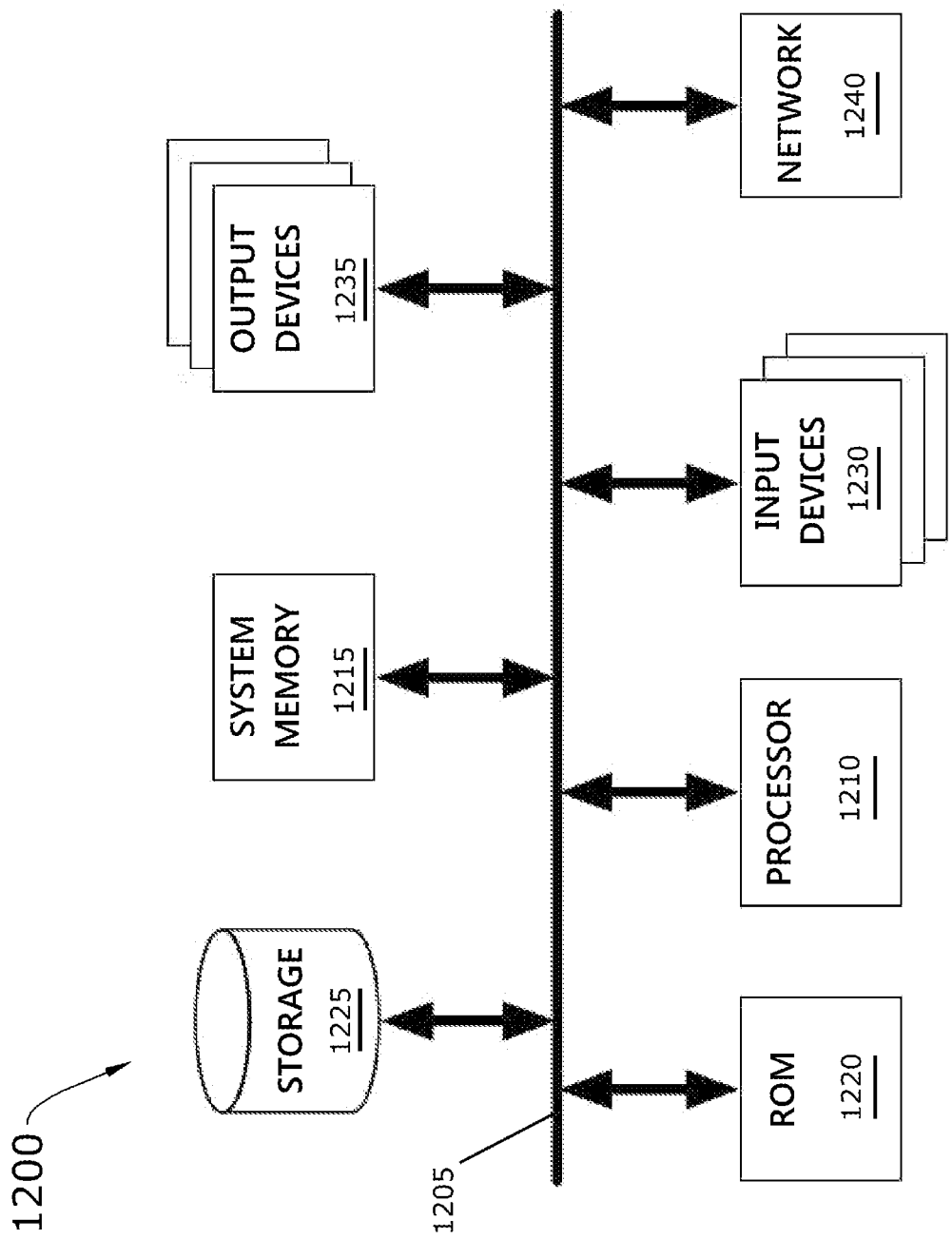
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer, mobile device, tablet, phone, PDA, or any other sort of electronic device. Such an electronic system includes various types of computer readable media and interfaces for various other types of computer readable media. Electronic system 1200 includes a bus 1205, processing unit(s) 1210, a system memory 1215, a read-only memory 1220, a permanent storage device 1225, input devices 1230, output devices 1235, and a network 1240.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1220, the system memory 1215, and the permanent storage device 1225.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1220 stores static data and instructions that are needed by the processing unit(s) 1210 and other modules of the electronic system. The permanent storage device 1225, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1225.

Other embodiments use a removable storage device (such as a floppy disk or a flash drive) as the permanent storage device 1225. Like the permanent storage device 1225, the system memory 1215 is a read-and-write memory device. However, unlike storage device 1225, the system memory 1215 is a volatile read-and-write memory, such as a random access memory. The system memory 1215 stores some of the instructions and data that the processor needs at runtime. In some embodiments, the invention's processes are stored in the system memory 1215, the permanent storage device 1225, and/or the read-only memory 1220. For example, the various memory units include instructions for processing appearance alterations of displayable characters in accordance with some embodiments. From these various memory units, the processing unit(s) 1210 retrieves instructions to execute and data to process in order to execute the processes of some embodiments.

The bus 1205 also connects to the input and output devices 1230 and 1235. The input devices enable the user to communicate information and select commands to the electronic system. The input devices 1230 include alphanumeric keyboards and pointing devices (also called "cursor control devices"). The output devices 1235 display images generated by the electronic system 1200. The output devices 1635 include printers and display devices, such as liquid crystal displays (LCD) and/or organic light emitting diode (OLED) displays. Some embodiments include devices such as a touchscreen that functions as both input and output devices.

Finally, as shown in FIG. 12, bus 1205 also couples electronic system 1200 to a network 1240 through a network adapter (not shown). In this manner, the computer can be a part of a network of computers (such as a local area network ("LAN"), a wide area network ("WAN"), or an intranet), or a network of networks (such as the Internet). Any or all components of electronic system 1200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the drawings conceptually illustrate runtime processes or methods, each with multiple steps. In each case, the specific operations of a process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for identifying personal identifiable information (PII) in a data container comprising:
   identifying a data container comprising data elements;
   filtering a set of required data elements that are accessible for interrogation at a fundamental level from the data elements of the identified data container, wherein the set of required data elements are accessible for interrogation at the fundamental level to review for presence of unsecured personal identifiable information in relation to any person;
   identifying an active rule to test each required data element in the set of required data elements of the identified data container;
   testing each required data element against the identified active rule;
   determining whether each test of the required data element against the identified active rule results in a match, wherein the test of the required data element against the identified active rule results in the match when personal identifiable information in the required data element is secure based on the required data element satisfying the test of the active rule, wherein the test of the required data element against the identified active rule results in a non-match when personal identifiable information in the required data element is unsecured based on the required data element failing the test of the active rule;
   storing match results for the tested required data elements that satisfy the test of the active rule;
   encrypting the identified data container and the tested required data elements that fail the test of the active rule in identified data container when at least one tested required data element fails the test of the active rule; and
   supplying the match results a user for review.

2. The method for identifying PII in a data container of claim 1 further comprising determining whether the data container is supported.

3. The method for identifying PII in a data container of claim 2, wherein the data container is supported when the data container is at least one of (i) configured with access permissions to the data container and (ii) organized for data storage as a particular type of data container comprising at least one of a file data container type, a spreadsheet data container type, a database table data container type, and a database data organization structure data container type.

4. The method for identifying PII in a data container of claim 1, wherein identifying an active rule to test each required data element in the set of required data elements of the identified data container comprises:
   identifying a first active rule to test a first required data element in the set of required data elements;
   determining whether the first active rule is a last active rule to test the first required data element in the set of required data elements;
   identifying a next active rule to test the first required data element in the set of required data elements when the first active rule is not the last active rule to test the first required data element in the set of required data elements;
   determining whether the first required data element in the set of required data elements is a last required data element in the set of required data elements when the first active rule is the last active rule to test the first required data element in the set of required data elements;
identifying a next required data element in the set of required data elements to test against the first active rule when the first required data element in the set of required data elements is not the last required data element in the set of required data elements; and
proceeding to supply any match results to the user when the first required data element in the set of required data elements is the last required data element in the set of required data elements.

5. The method for identifying PII in a data container of claim 1, wherein encrypting the identified data container and the tested required data elements that fail the test of the active rule in identified data container when at least one required data element fails the test of the active rule comprises:
   obtaining an encryption key to use in securing the identified data container and the tested required data elements that fail the test of the active rule in identified data container;
   retrieving the identified data container;
   applying the encryption key to the identified data container and the tested required data elements that fail the test of the active rule in identified data container using a secure encryption standard; and
   storing the encrypted data container.

6. The method for identifying PII in a data container of claim 5, wherein obtaining the encryption key to use in securing the identified data container comprises:
   retrieving a particular encryption key from a particular encryption key repository;
   determining whether the particular encryption key retrieved from the particular encryption key repository requires an update; and
   updating the particular encryption key when the particular encryption key retrieved from the particular encryption key repository requires the update.

7. The method for identifying PII in a data container of claim 1, wherein the identified data container is a particular data container of an application that is edited by a user to include a plurality of new and updated data elements, wherein the particular data container of the application requires reviewing and securing of the particular data container to secure personal identifiable information within the plurality of new and updated data elements of the particular data container, wherein the application automatically retrieves and applies an encryption key to use in securing the particular data container when the application is closed.

8. The method for identifying PII in a data container of claim 7, wherein a listener detects when the application is opened, wherein identifying the data container that is supported and needs reviewing comprises determining whether the data container is encrypted, wherein the application presents an input prompt for entry of an encryption key when the data container is determined to be encrypted, wherein the method for identifying PII in a data container further comprises:
   identifying the input prompt for entry of the encryption key for decoding the encrypted data container;
   obtaining the encryption key from an associated encryption key storage repository; and
   automatically using the obtained encryption key to decode the encrypted data container for use within the application.

9. The method for identifying PII in a data container of claim 8, wherein automatically using the obtained encryption key to decode the encrypted data container for use within the application comprises simulating user input of the encryption key within the input prompt while automatically using the encryption key to decode the encrypted data container.

10. The method for identifying PII in a data container of claim 6, wherein the particular encryption key repository is a single encryption key repository in a plurality of encryption key repositories, wherein obtaining the encryption key to use in securing the identified data container further comprises:
   checking for any encryption key that is available for retrieval in any encryption key repository of the plurality of encryption key repositories;
   determining whether any encryption key is found in and available for retrieval from any encryption key repository in the plurality of encryption key repositories;
   generating a new encryption key when no encryption key is found in and available for retrieval from any encryption key repository in the plurality of encryption key repositories; and
   storing the new encryption key in at least one encryption key repository of the plurality of encryption key repositories.

11. The method for identifying PII in a data container of claim 1, wherein the set of required data elements comprise mixed types of data elements tested against different active rules.

12. The method for identifying PII in a data container of claim 1, wherein the data container comprises an in-transit data container, wherein testing each required data element in the in-transit data container against the identified active rule comprises interrogating each required data element during network transmission and applying complex rule matching.

13. The method for identifying PII in a data container of claim 1, wherein the identified active rule comprises a first active rule, wherein testing each required data element against the identified active rule comprises testing a first required data element in the set of required data elements against the first active rule, wherein determining whether each test of the required data element against the identified active rule results in a match comprises determining whether the test of the first required data element against the first active rule results in a match, wherein storing match results for the tested required data elements that satisfy the test of the active rule comprises storing match results for the first tested required data element that satisfies the test of the first active rule.

14. The method for identifying PII in a data container of claim 13 further comprising:
   determining whether a match limit is reached after storing match results for the first tested required data element that satisfies the test of the first active rule;
   supplying the match results for only the first tested required data element that satisfies the test of the first active rule to the user for review when the match limit is reached;
   determining whether the keep the first active rule active when the match limit is not reached;
   deactivating the first active rule only when the first active rule is not determined to remain active;
   determining whether the first active rule is a last active rule to test the first required data element in the set of required data elements;

identifying a next active rule to test the first required data element in the set of required data elements when the first active rule is not the last active rule to test the first required data element in the set of required data elements;

determining whether the first required data element in the set of required data elements is a last required data element in the set of required data elements when the first active rule is the last active rule to test the first required data element in the set of required data elements; and identifying a next required data element in the set of required data elements to test against the first active rule only when the first active rule is not deactivated and the first required data element in the set of required data elements is not the last required data element in the set of required data elements.

15. The method for identifying PII in a data container of claim 14, wherein deactivating the first active rule comprises disabling the first active rule.

16. The method for identifying PII in a data container of claim 14, wherein deactivating the first active rule comprises removing the first active rule.

\* \* \* \* \*